(12) United States Patent
Watanabe et al.

(10) Patent No.: US 11,542,701 B2
(45) Date of Patent: Jan. 3, 2023

(54) BOOTH

(71) Applicant: FUJIFILM Business Innovation Corp., Tokyo (JP)

(72) Inventors: Shu Watanabe, Kanagawa (JP);
Akihide Kawamura, Kanagawa (JP);
Kunichi Yamashita, Kanagawa (JP);
Akira Takahashi, Tokyo (JP);
Yoshihiro Shibanai, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/195,659

(22) Filed: Mar. 9, 2021

(65) Prior Publication Data
US 2021/0189714 A1    Jun. 24, 2021

Related U.S. Application Data

(63) Continuation of application No. 16/256,964, filed on Jan. 24, 2019, now Pat. No. 10,975,564.

(30) Foreign Application Priority Data

Jul. 10, 2018    (JP) .............................. JP2018-130366

(51) Int. Cl.
*E04B 1/343*    (2006.01)
*E04B 1/41*    (2006.01)
*E04H 1/12*    (2006.01)

(52) U.S. Cl.
CPC ............ *E04B 1/34326* (2013.01); *E04B 1/40* (2013.01); *E04H 1/125* (2013.01); *E04H 1/1205* (2013.01); *E04B 2103/04* (2013.01); *E04B 2103/06* (2013.01)

(58) Field of Classification Search
CPC .... E04B 1/34326; E04B 1/40; E04B 1/34384; E04B 1/34861; E04B 2103/06; E04B 2103/04; E04H 1/1205; E04H 1/125; E04H 1/12; E04H 1/1261; A47B 2200/0071
See application file for complete search history.

(56) References Cited

U.S. PATENT DOCUMENTS 3,200,546 A ‡ 8/1965 Losak ....................... E04H 1/12
                                                            52/94
4,695,903 A ‡ 9/1987 Serap ..................... G07F 17/28
                                                            360/55

(Continued)

FOREIGN PATENT DOCUMENTS

CA    3055254 A1 * 9/2018 ............. F21S 8/061
CN    1195733    10/1998

(Continued)

OTHER PUBLICATIONS

"Office Action of Japan Related Application, application No. 2019-001955", dated Jan. 7, 2020, p. 1-p. 2.‡

(Continued)

*Primary Examiner* — Theodore V Adamos
(74) *Attorney, Agent, or Firm* — JCIPRNET

(57) ABSTRACT

A booth includes a replaceable side wall that surrounds an internal space to be used by a user, and the side wall is provided with at least one entrance/exit door.

18 Claims, 20 Drawing Sheets

(56) References Cited

U.S. PATENT DOCUMENTS

| | | | | |
|---|---|---|---|---|
| 5,024,398 A | * | 6/1991 | Riedinger | B64D 11/0015 244/118.5 |
| 5,282,341 A | * | 2/1994 | Baloga | A47B 83/001 49/41 |
| 5,452,547 A | ‡ | 9/1995 | Baloga | A47B 83/001 49/41 |
| 6,158,174 A | * | 12/2000 | Mairs | A45D 29/00 52/34 |
| 9,631,358 B1 | ‡ | 4/2017 | Trahan | E04B 1/34321 |
| 10,174,515 B1 | * | 1/2019 | Krivens | A47B 83/02 |
| 2002/0100227 A1 | ‡ | 8/2002 | Barnhouse | E04B 2/7433 52/36.1 |
| 2002/0194796 A1 | * | 12/2002 | Kress | E04H 3/08 52/79.1 |
| 2006/0292973 A1 | ‡ | 12/2006 | Brooks | E04H 1/125 454/50 |
| 2009/0223161 A1 | * | 9/2009 | Segall | E04B 1/14 52/588.1 |
| 2010/0050556 A1 | | 3/2010 | Burns | |
| 2011/0069944 A1 | * | 3/2011 | Johnson | G03B 15/00 396/2 |
| 2012/0130867 A1 | * | 5/2012 | Motegi | G06Q 10/087 705/28 |
| 2012/0253837 A1 | * | 10/2012 | Cashman | G16H 40/67 705/2 |
| 2012/0304549 A1 | ‡ | 12/2012 | Rutledge | E04B 1/34315 52/16 |
| 2014/0047778 A1 | ‡ | 2/2014 | DiGregory | E04B 1/34384 52/2.25 |
| 2014/0123572 A1 | ‡ | 5/2014 | Segall | G09B 9/003 52/79.5 |
| 2015/0033639 A1 | ‡ | 2/2015 | Wilson | E04H 9/04 52/79.5 |
| 2016/0194891 A1 | ‡ | 7/2016 | McDaniel, Jr. | E04H 1/1205 52/36.4 |
| 2017/0121961 A1 | ‡ | 5/2017 | Hodson | E04B 1/34321 |
| 2017/0198485 A1 | ‡ | 7/2017 | Tanner | E04H 1/12 |
| 2017/0260737 A1 | * | 9/2017 | Ota | E04B 1/24 |
| 2017/0306610 A1 | | 10/2017 | Leahy | |
| 2017/0337783 A1 | * | 11/2017 | Konecny | G07F 19/202 |
| 2017/0356182 A1 | * | 12/2017 | Caffaratti Giro | E04B 1/8218 |
| 2019/0010692 A1 | ‡ | 1/2019 | Segall | E04B 1/6162 |
| 2019/0248498 A1 | | 8/2019 | Kimizuka et al. | |
| 2019/0271148 A1 | ‡ | 9/2019 | Hodson | E04H 1/005 |
| 2019/0301183 A1 | ‡ | 10/2019 | Shin | E04H 1/005 |
| 2021/0131678 A1 | * | 5/2021 | Tsu | F24F 1/0007 |

FOREIGN PATENT DOCUMENTS

| | | | | |
|---|---|---|---|---|
| CN | 1349033 | | 5/2002 | |
| CN | 204510882 | | 7/2015 | |
| CN | 204850542 | | 12/2015 | |
| CN | 205776760 | | 12/2016 | |
| CN | 107806256 | | 3/2018 | |
| EP | 0434384 | | 6/1991 | |
| EP | 0863267 | | 9/1998 | |
| EP | 2161393 A2 | * | 3/2010 | E04H 1/125 |
| GB | 2024911 | | 1/1980 | |
| JP | H01127765 | | 5/1989 | |
| JP | 3027406 | | 8/1996 | |
| JP | H10212780 | | 8/1998 | |
| JP | 2002130786 | ‡ | 5/2002 | |
| JP | 2002364253 | | 12/2002 | |
| JP | 2004062847 | | 2/2004 | |
| JP | 2004086582 | ‡ | 3/2004 | |
| JP | 2004206698 | | 7/2004 | |
| JP | 2006070550 | ‡ | 3/2006 | |
| JP | 3994065 | ‡ | 10/2007 | |
| JP | 2011144533 | | 7/2011 | |
| JP | 2016108781 | | 6/2016 | |
| WO | 2018051497 | | 3/2018 | |

OTHER PUBLICATIONS

"Office Action of China Counterpart Application" with English translation thereof, dated Jan. 27, 2022, p. 1-p. 23.

"Office Action of Japan Counterpart Application" with English translation thereof, dated May 10, 2022, p. 1-p. 9.

"Office Action of China Counterpart Application", dated Jun. 27, 2022, with English translation thereof, pp. 1-22.

"Office Action of Japan Counterpart Application" with English translation thereof, dated Sep. 6, 2022, p. 1-p. 8.

\* cited by examiner
‡ imported from a related application

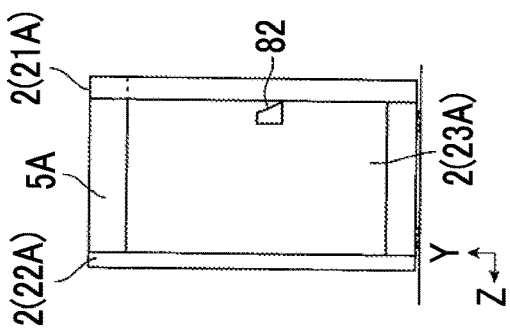
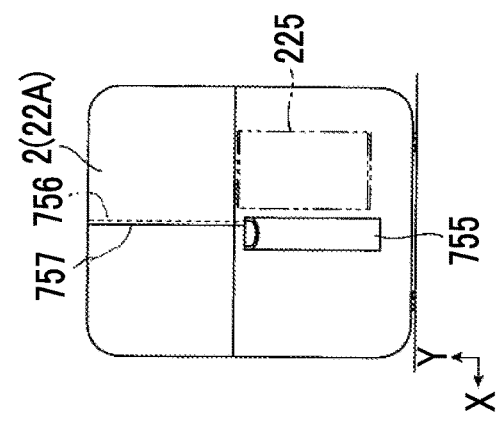
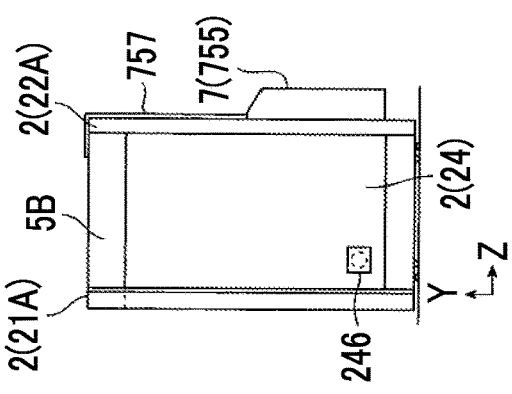
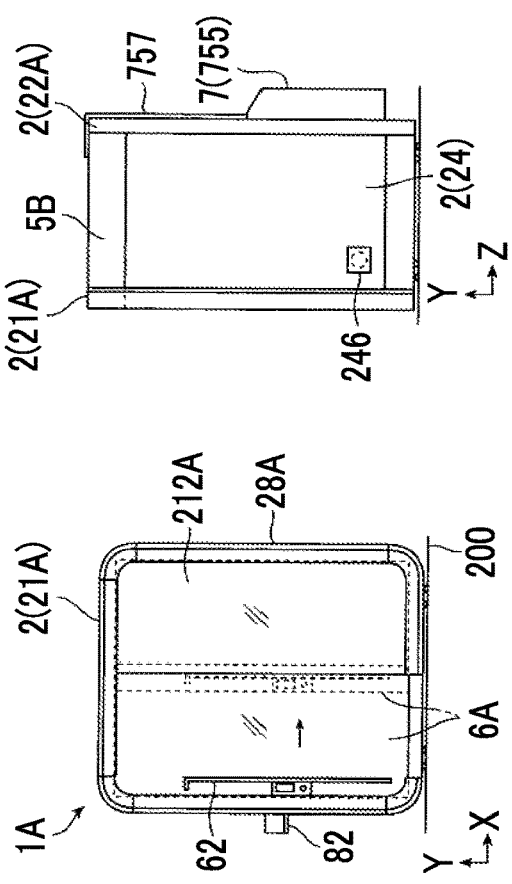
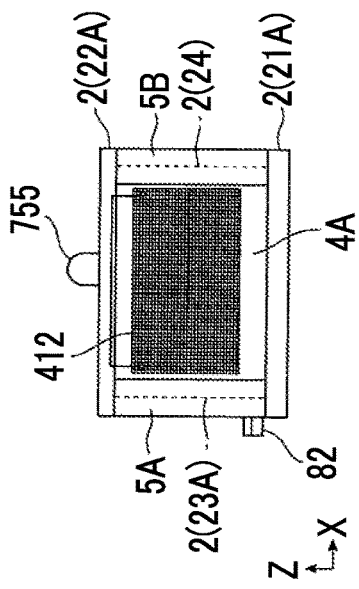

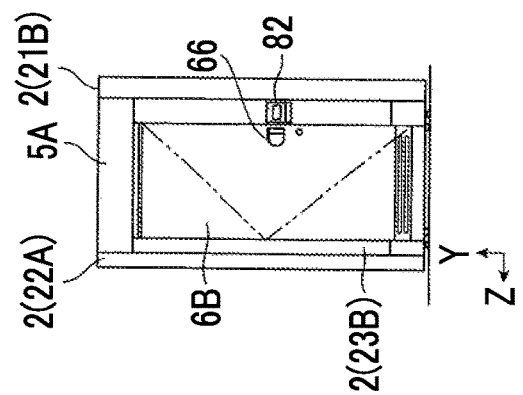
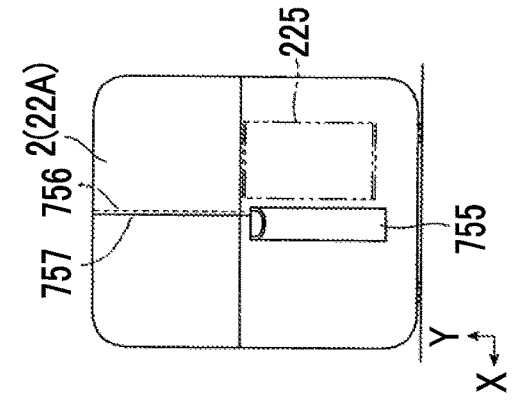
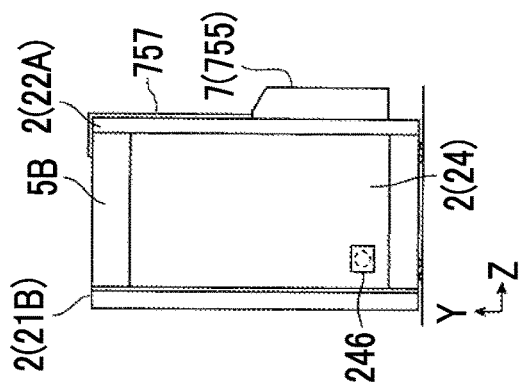
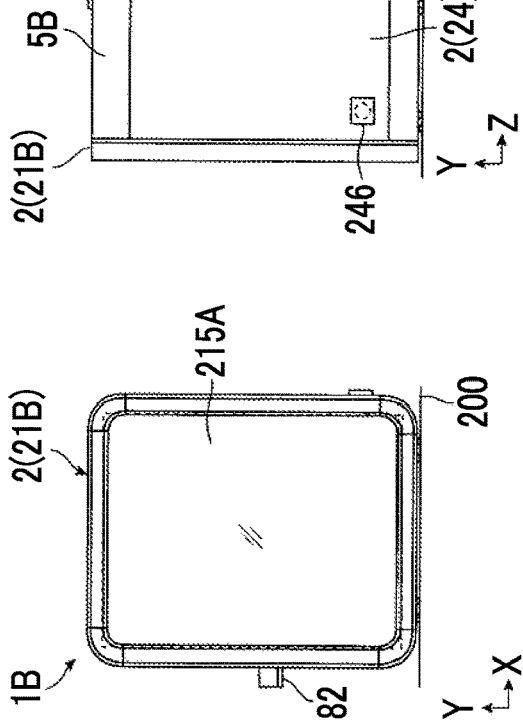
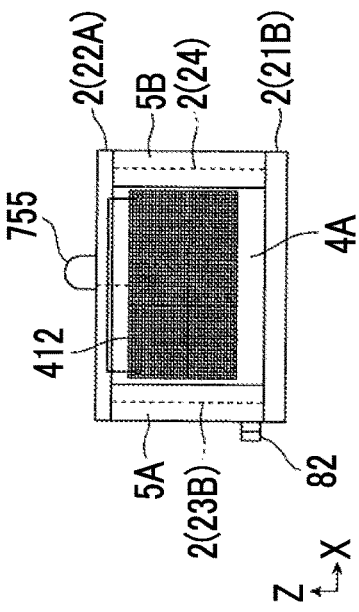

FIG. 6B
FIG. 6A
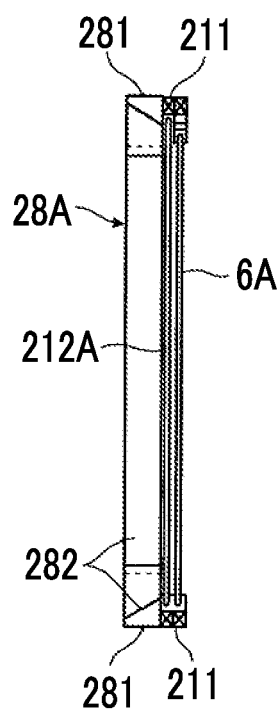
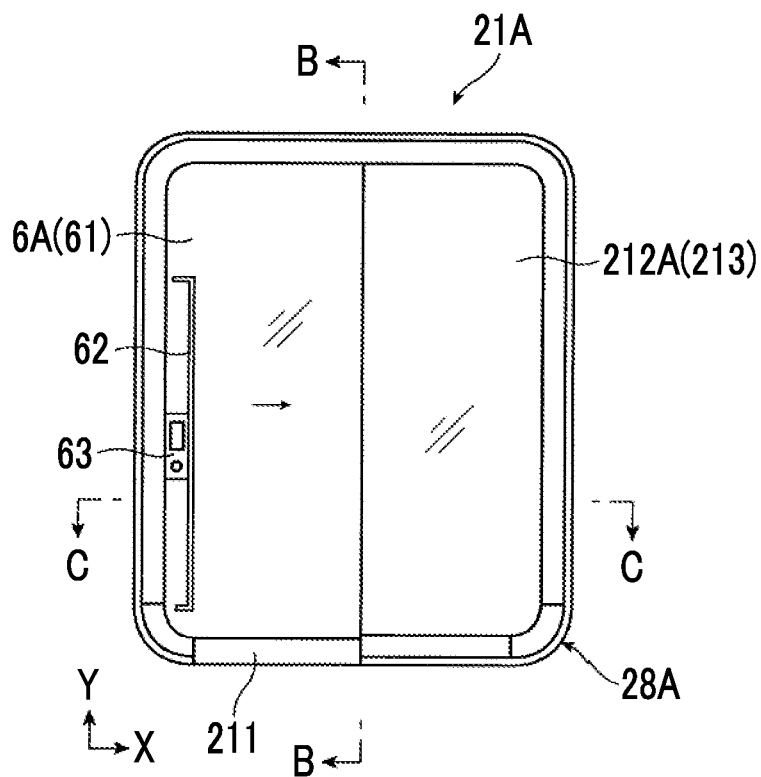
FIG. 6C
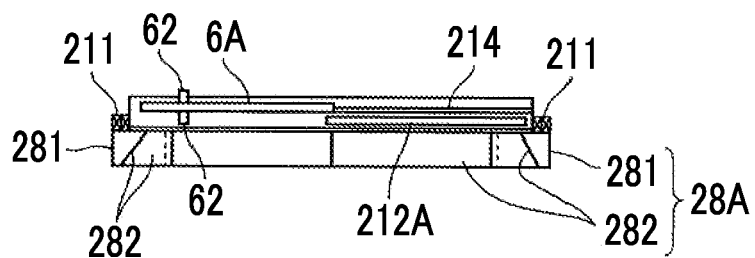

FIG. 7B
FIG. 7A
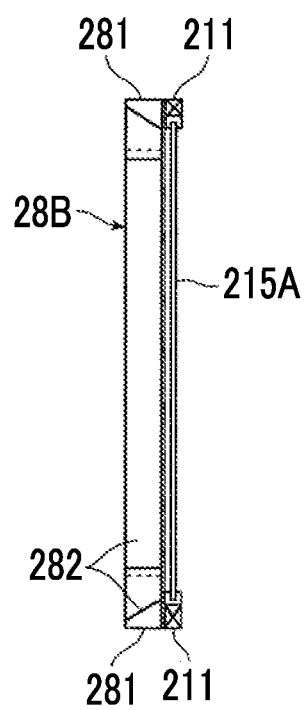
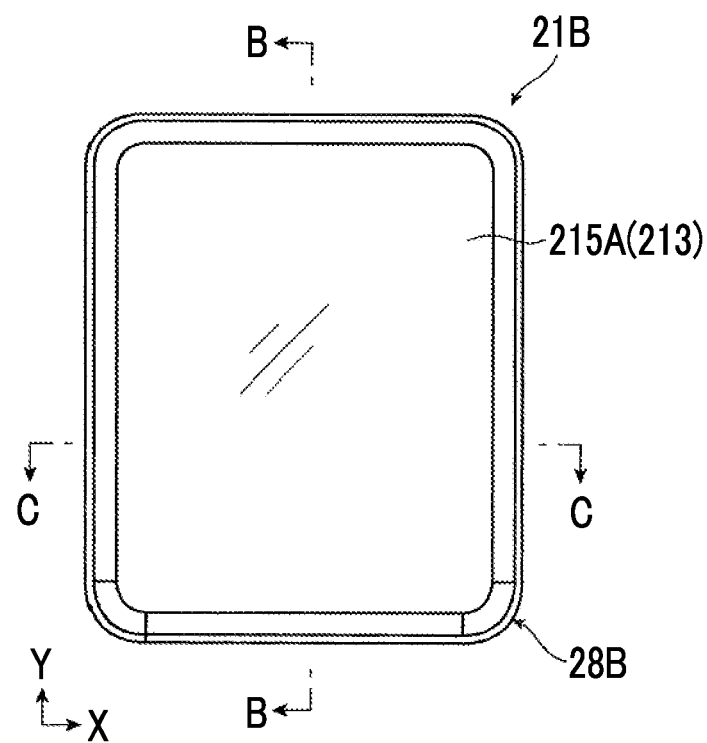
FIG. 7C
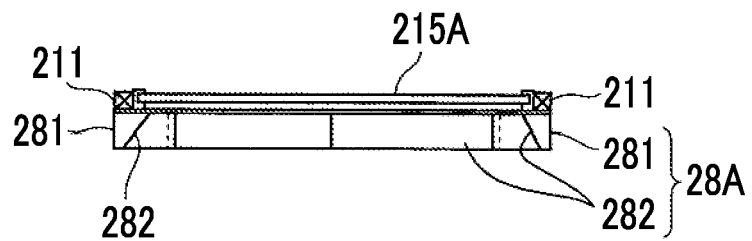

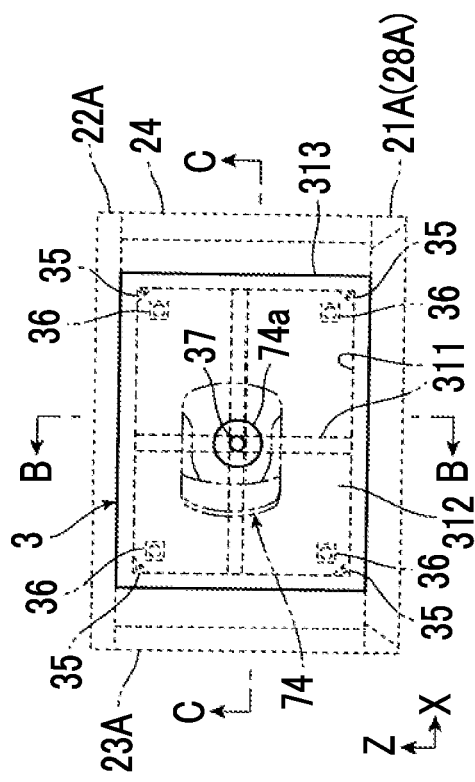
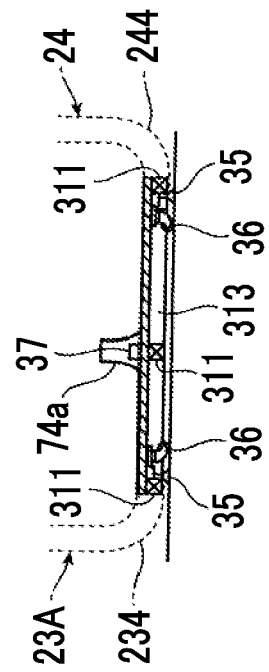
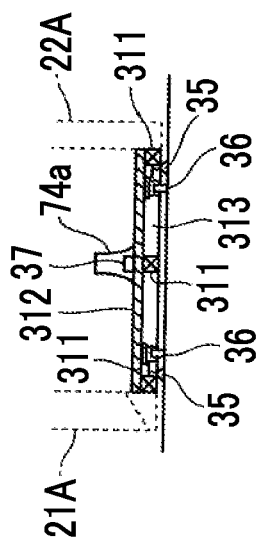

BOOTH

CROSS-REFERENCE TO RELATED APPLICATIONS

This is a continuation application of and claims the priority benefit of a prior application Ser. No. 16/256,964 filed on Jan. 24, 2019, now allowed. The prior application Ser. No. 16/256,964 is based on and claims priority under 35 USC 119 from Japanese Patent Application No. 2018-130366 filed Jul. 10, 2018. Each of the above application(s) is hereby expressly incorporated by reference, in its entirety, into the present application.

BACKGROUND

(i) Technical Field

The present invention relates to a booth.

(ii) Related Art

In the related art, as techniques relevant to booths, those described in the following JP3994065B (claims 1, 4, and 5; FIGS. 1 to 6), JP2006-070550A (claim 1; FIGS. 1 to 20), JP2002-130786A (claim 1; FIGS. 1 to 20), and JP2004-086582A (claim 1) are known.

JP3994065B discloses a single room box configured of a ceiling panel, a floor panel, and four front, rear, right, and left wall panels. In the single room box, the respective panels are configured of lightweight panels, halves of a pair of facing wall panel are provided with detachable slide type doors, the wall panels of the respective four faces other than the slide type doors have a folded structure. Additionally, JP3994065B discloses configuration in which the wall panels are provided with translucent windows, and a configuration in which the floor panel is also provided with casters for movement.

JP2006-070550A discloses an assembled single room type booth including a plurality of side panel units each having a side panel member of which at least an outer wall face has a secondary curved surface shape and an elongated square tubular coupling interposed member joined so as to hold the side panel member at both ends; and a bottom member having a supporting part that abuts against lower end parts of the side panel members in at least a pair of the side panel units that face each other among the plurality of side panel units. In this assembled single room type booth. A plurality of panel coupling parts are provided in a longitudinal direction on an open end of the coupling interposed member. The supporting part of the bottom member is provided with a panel coupling member. The panel coupling member is provided at the lower end parts of the side panel members that abut against the supporting part. The assembled single room type booth is assembled in a substantially cylindrical shape by coupling the plurality of side panel units and the bottom member by the panel coupling parts.

JP2002-130786A discloses a ventilating device for a desk work system. In this desk work system, a desk top plate for allowing a person to perform desk work is provided inside a booth that covers the periphery of the booth with a wall and is provided with a ceiling. In this ventilating device, at least any one of an intake passage for taking air into the booth from the outside or an exhaust passage for exhausting the air inside the booth upward is provided inside the wall. Moreover, one or both of an intake fan that suctions air from the outside via the intake passage and an exhaust fan that discharges the air within the booth via an exhaust passage are provided in appropriate regions of the booth.

JP2004-086582A discloses a rental booth that provides a space, which is available by a user, for a predetermined time. This rental booth is configured to include a unit for certifying the user, an electrical lock for managing entrance and exit with respect to the space, and a computer terminal to be used by the user. The computer terminal is configured to function as a unit for providing service the user, and a unit for receiving a request from the user.

SUMMARY

Aspects of non-limiting embodiments of the present disclosure relate to a booth capable of changing or adding configuration contents corresponding to use conditions, such as installation locations and use forms.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a booth including a replaceable side wall that surrounds an internal space to be used by a user, and the side wall is provided with at least one entrance/exit door.

BRIEF DESCRIPTION OF THE DRAWINGS

Exemplary embodiment(s) of the present invention will be described in detail based on the following figures, wherein:

FIGS. 4A to 4E are views illustrating respective external appearances as viewed from the front, the right side, the back, the left side, and the top of the booth of FIG. 1;

FIGS. 5A to 5E are views illustrating respective external appearances as viewed from the front, the right side, the back, the left side, and the top of the booth of FIG. 2;

FIG. 6A is a front view illustrating a first type of front wall, FIG. 6B is a schematic cross-sectional view taken along line B-B of the front wall of FIG. 6A, and FIG. 6C is a schematic cross-sectional view taken along line C-C of the front wall of FIG. 6A;

FIG. 7A is a front view illustrating a second type of front wall, FIG. 7B is a schematic cross-sectional view taken along line B-B of the front wall of FIG. 7A, and FIG. 7C is a schematic cross-sectional view taken along line C-C of the front wall of FIG. 7A;

FIG. 12A is a plan view illustrated in a state where a floor material is viewed from above, FIG. 12B is a schematic cross-sectional view taken along line B-B of the floor material FIG. 12A, and FIG. 12C is a schematic cross-sectional view taken along line C-C of the floor material of FIG. 12A;

DETAILED DESCRIPTION

Figure 1:
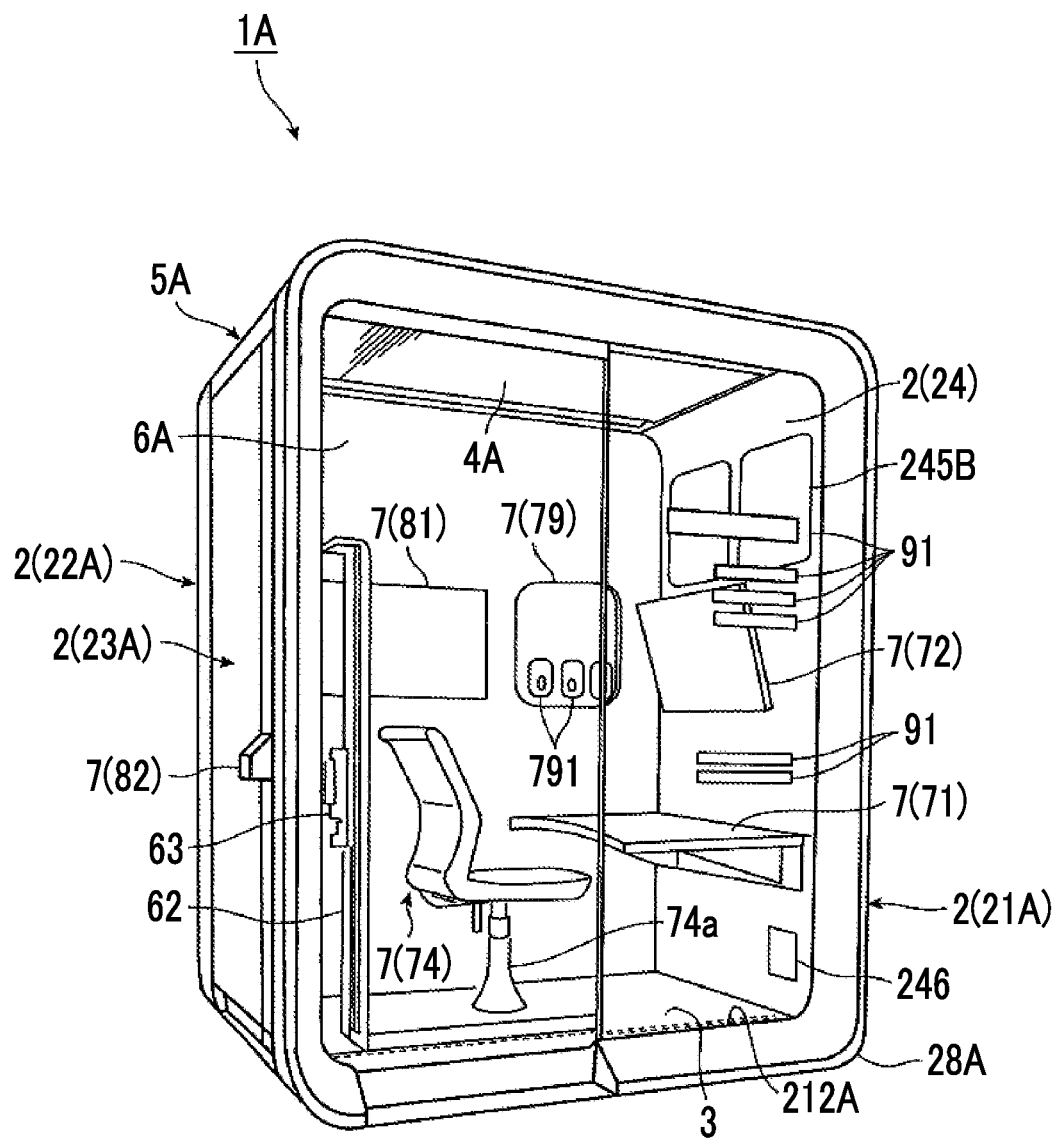
FIG. 1 is a perspective view illustrating a configuration example of a booth related to Exemplary Embodiment 1.

Hereinafter, exemplary embodiments for carrying out the invention will be described referring to the drawings.

Exemplary Embodiment 1

Figure 2:
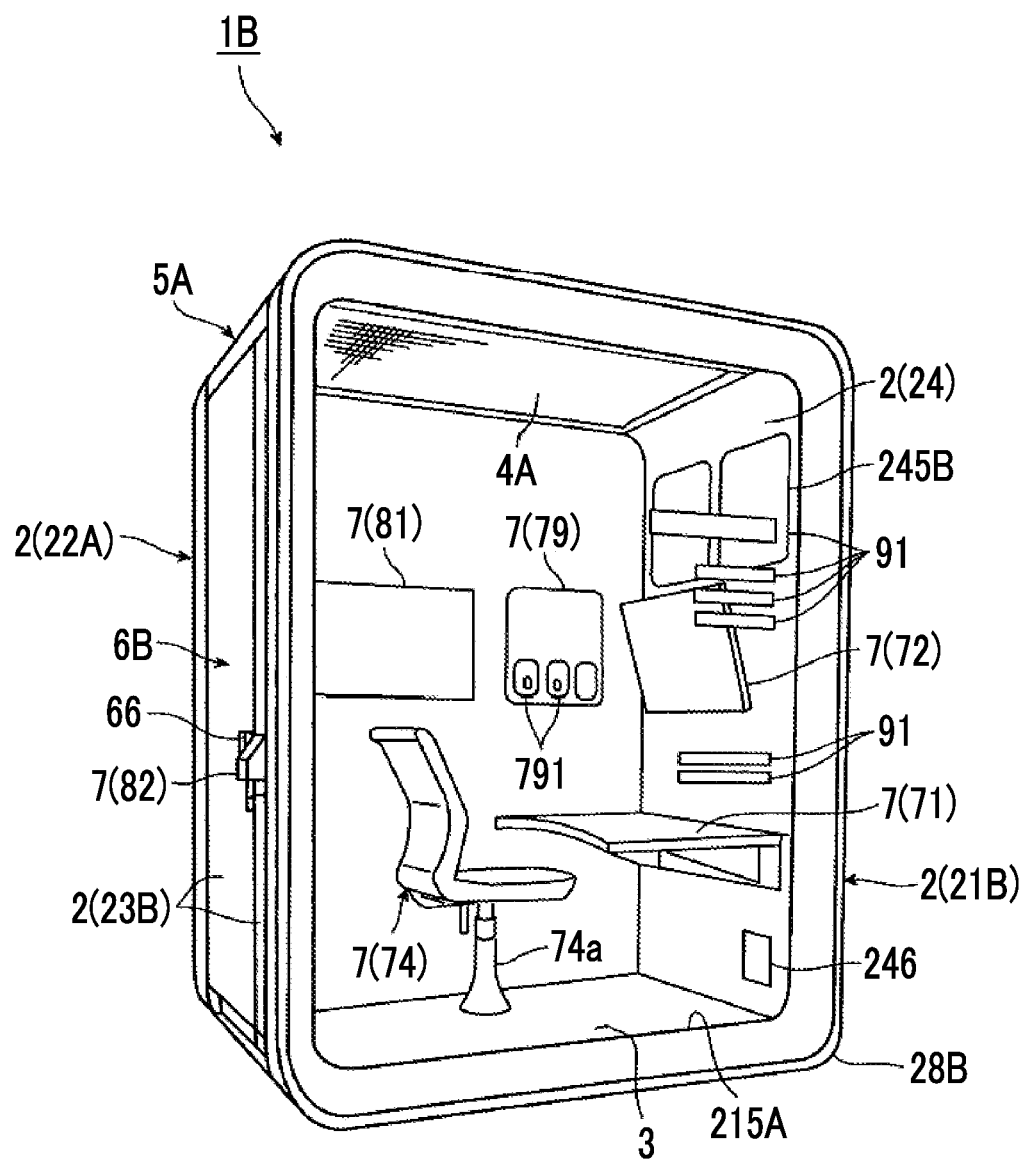
FIG. 2 is a perspective view illustrating a different configuration example of the booth related to Exemplary Embodiment 1.
Figure 3:
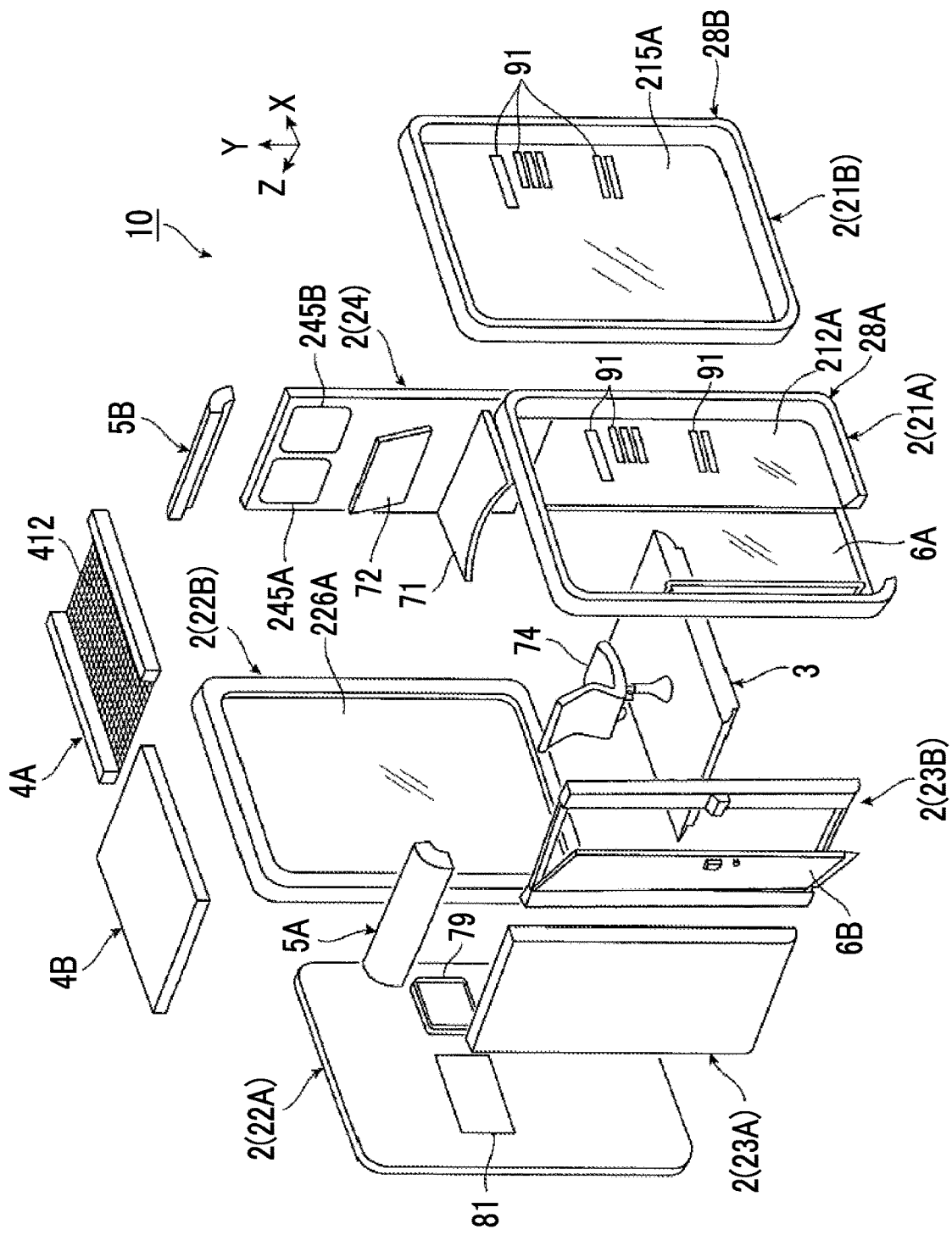
FIG. 3 is a perspective view illustrating a configuration example of a kit of the booth related to Exemplary Embodiment 1.

FIGS. 1 to 3 illustrate Exemplary Embodiment 1 of the invention. FIGS. 1 and 2 illustrate two configuration examples (1A, 1B) in which configuration contents of a booth 1 related to Exemplary Embodiment 1 are different from each other, and FIG. 3 illustrates a configuration example of a kit 10 of a booth including components capable of constructing a booth 1A of FIG. 1 and a booth 1B of FIG. 2.

Arrows indicated by reference signs X, Y, and Z in the respective drawings indicate respective directions of the width, the height, and the depth of a three-dimensional space assumed in the respective drawings.

Configuration of Booth

As illustrated in FIG. 1 and FIG. 2, both the booths 1A and 1B related to Exemplary Embodiment 1 are configured of a replaceable side wall 2 that surrounds an internal space to be used by a user, and a floor material 3, a ceiling material 4, and a corner portion material 5 in addition to the side wall 2, and the side wall 2 is provided with one entrance/exit door 6.

The two booths 1A and 1B are used not only by being installed indoors but also are used by being installed outdoors (regardless of the presence or absence of a roof). The details will be described below.

The side wall 2 is configured of four divided side walls of a front wall 21, a back wall 22, a left side wall 23, and a right side wall 24.

Additionally, the corner portion material 5 is used as a member that constitutes at least some corner portions in the booths 1A and 1B. Since four corners of each of the front wall 21 and the back wall 22 having a vertically long, substantially oblong external appearance have a curved surface shape, the corner portion material 5 in Exemplary Embodiment 1 is used in order to form corner portions of a curved surface shape matched with the curved surface shape of two upper corners among the four corners.

Additionally, in the two booths 1A and 1B, the same members are adopted as the back walls 22, the right side walls 24, the floor materials 3, the ceiling materials 4, and the corner portion materials 5, and the configuration contents are common in this respect.

Meanwhile, the two booths 1A and 1B has mutually different configuration contents in that, in the booth 1A, a front wall 21A provided with an entrance/exit door 6A is adopted as the front wall 21 and a left side wall 23A with no entrance/exit door is adopted as the left side wall 23, whereas in the booth 1B, a front wall 21B with no entrance/exit door is adopted as the front wall 21 and a left side wall 23B provided with an entrance/exit door 3B is adopted as the left side wall 23.

Configuration of Kit

The kit 10 of the booth related to Exemplary Embodiment 1 is a kit including components including the side wall 2 capable of being constructed by selecting at least the two booths 1A and 1B.

That is, although the kit 10 can be constructed by selecting one of the two booths 1A and 1B, the two booths 1A and 1B cannot be simultaneously constructed. For this reason, the kit 10 is a kit that may include components capable of completing booths mutually having a different configuration content, and a kit that does not need to include components that can complete a plurality of booths having the same configuration contents at a time.

Specifically, as illustrated in FIG. 3, the kit 10 includes components configured of the side wall 2, the floor material 3, the ceiling material 4, and the corner portion material 5. Among these, a side wall configured of the four divided side walls of the front wall 21, the back wall 22, the left side wall 23, and the right side wall 24 is applied as the side wall 2.

The kit 10 has a configuration including at least the replaceable side wall 2 as a component.

Specifically, in the kit 10, as the divided side walls of the side wall 2, the right side wall 24 includes one type of right side wall, but the front wall 21, the back wall 22, and the left side wall 23 other than this include two types of front walls 21A and 21B, two types of back walls 22A and 22B, and two types of left side walls 23A and 23B having mutually different configuration contents, respectively. That is, the kit 10 has a configuration including the two types of replaceable front walls 21A and 21B, the two types of replaceable back walls 22A and 22B, and the two types of replaceable left side walls 23A and 23B, as the divided side walls of the side wall 2 that are components.

Additionally, the kit 10 includes one type of floor material as the floor material 3, and includes two types of ceiling material 4A and 4B and two types of corner portion materials 5A and 5B having mutually different configuration contents as the ceiling material 4 and corner portion material 5, respectively. That is, the kit 10 also has a configuration including the two types of replaceable ceiling materials 4A and 4B and the two types of corner portion materials 5A and 5B, as the ceiling material and the corner portion material that are components.

Here, a first type of front wall 21A of a type in which an entrance/exit door is provided, and a second type of front wall 21B in a form with no entrance/exit door are prepared as the two types of front walls 21A and 21B. Additionally, a first type of left side wall 23A in a form with no entrance/exit door and a second type of left side walls 23B of a type in which an entrance/exit door is provided are prepared as the two types of left side walls 23A and 23B.

Relationship Between Two Booths

As illustrated in FIGS. 4A to 4E and the like, the booth 1A illustrated in FIG. 1 becomes a booth that can be constructed by selecting and combining components of the front wall 21A, the back wall 22A, the left side wall 23A, the right side wall 24, the floor material 3, and the ceiling material 4A from the components of the kit 10. The booth 1A becomes, for example, one of the booths suitable for a use condition under which an entrance/exit door is present on the front side.

Meanwhile, as illustrated in FIGS. 5A to 5E and the like, the booth 1B illustrated in FIG. 2 is a booth that can be constructed by replacing the front wall 21A and the left side wall 23A of the booth 1A with the front wall 21B and the left side wall 23B included in the components of the kit 10, respectively. The booth 1B becomes a booth in which the position of an entrance/exit door is changed to the left side from the front side and the configuration contents are different, compared to the booth 1A. Additionally, in this case, the booth 1B is also a booth in which the type of entrance/exit door is also changed. The booth 1B becomes, for example, one of the booths suitable for a use condition under which the entrance/exit door is present on the left side.

Incidentally, the booth 1A can be a booth that can be constructed by replacing the front wall 21B and the left side wall 23B of the booth 1B with the front wall 21A and the left side wall 23A included in the components of the kit 10, respectively, in a case where the booth 1B is constructed by selecting and combining components (the front wall 21B, the back wall 22A, the left side wall 23B, the right side wall 24, the floor material 3, and the ceiling material 4A previously required from the kit 10.

Configuration of Respective Components of Kit

Subsequently, the respective components, such as the divided side walls of the side wall 2 in the kit 10, will be described.

First, the first type of front wall 21A is a front wall of a type in which an entrance/exit door is provided. As illustrated in FIGS. 6A to 6C and the like, the front wall 21A is a divided side wall of a structure configured of an outer peripheral frame 211, a fixed front part 212 provided at a substantially right half opening portion as viewed from a front side of the outer peripheral frame 211, and an entrance/exit door 6A movably provided at the remaining left opening portion (entrance/exit) as viewed from the front side of the outer peripheral frame 211.

Among these, the outer peripheral frame 211 is a frame material that is assembled in a vertically long, substantially oblong frame shape and is made of, such as, a metallic material. Additionally, the portion of the outer peripheral frame 211 that is exposed to the outside is provided and covered with an outer peripheral surface material (not illustrated).

The fixed front part 212 is configured as a see-through fixed front part 212A, and is formed using, for example, a colorless transparent or colored transparent tempered glass 213.

Here, the term "see-through" refers to a state where the outline or a detailed portion (information, such as texts) of an object is seen in an accurately discriminable manner (visually recognizable manner) when the object on the other side of an inclusion is seen through the inclusion at the end of the line of sight.

The entrance/exit door 6A is configured as a see-through door, and a body of the door is formed using, for example, the colorless transparent tempered glass 61.

Additionally, a sliding-door type door, which opens and closes an entrance/exit by being reciprocally moved between a left opening portion serving as an entrance/exit of the outer peripheral frame 211, and a back side of the fixed front part 212A, is applied as the entrance/exit door 6A. The entrance/exit door 6A is movably supported in a state where an upper part thereof is hung from an upper side part of the outer peripheral frame 211, while the entrance/exit door 6A is attached such that a lower part thereof is guided by a guide rail 214 formed at a lower side part of the outer peripheral frame 211.

Moreover, a left end part of the entrance/exit door 6A is provided with a gripping part 62, such as a handle, which protrudes to the outside and the inside of the door, a locking part 63, and the like. The locking part 63 is configured of, for example, an electric key that performs unlocking and locking in an electric-powered manner on the basis of information detected by certifying a user with a certification unit (821) (to be described below) from the outside of the booth. Additionally, the locking part 63 also has a configuration in which the locking part 63 can be unlocked and locked by a user's manual operation from the inside of the booth.

Additionally, in the front wall 21A, a frame (so-called bezel) 28 is provided outside of the outer peripheral frame 211.

The frame 28 in the front wall 21A is a frame 28A of a shape that protrudes outward continuously with the portion of the outer peripheral frame 211 excluding a lower part (a portion interrupted at a lower part of the entrance/exit) of the entrance/exit provided with the entrance/exit door 6A. As the frame 28A, for example, there is applied a frame of a shape having an outer peripheral surface part 281 that forms a vertically long, substantially oblong contour line in which four corners have a circular-arc curved surface shape outside the outer peripheral frame 211 and that protrudes toward the front, and an inclined inner surface part 282 that is inclined in a direction gradually away from the outer peripheral surface part 281 inside a vertically long, substantially oblong contour line from the outer peripheral surface part 281.

In a case where such a frame 28A is provided, at least one of impartment or reinforcement of decoration of the front wall 21A itself and eventually the booth 1A is made possible.

The second type of front wall 21B is a front wall of a type in which an entrance/exit door is not provided. As illustrated in FIG. 7A to 7C and the like, the front wall 21B is a divided side wall of a structure configured of the outer peripheral frame 211, the fixed front part 215 provided at an entire opening portion of the outer peripheral frame 211, and the frame 28 provided outside the outer peripheral frame 211.

Among these, the outer peripheral frame 211 is the same as the outer peripheral frame 211 in the front wall 21A. The fixed front part 215 has a portion attached to the outer peripheral frame 211 configured as a see-through fixed front part 215A, and is formed using, for example, the colorless transparent or colored transparent tempered glass 213.

The frame 28 is a frame 28B provided continuously with the entire outside (entire circumference) of the outer peripheral frame 211. The frame 28B is configured to be the same as the frame 28A in the front wall 21A except for being provided continuously in its entirety without being interrupted on the way.

In a case where such a frame 28B is provided, at least one of impartment or reinforcement of decoration (decorativeness) of the front wall 21B itself and eventually the booth 1A is made possible.

Figure 8A:
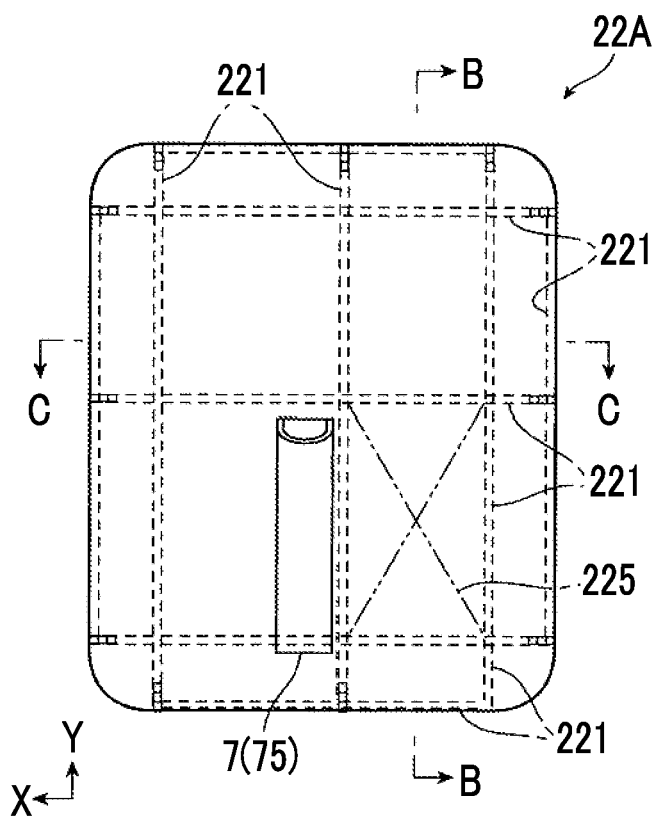
FIG. 8A is a back view illustrating the first type of back wall.
Figure 8B:
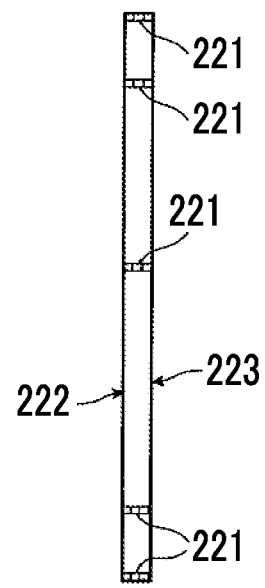
FIG. 8B is a schematic cross-sectional view taken along line B-B of the back wall of FIG. 8A.
Figure 8C:
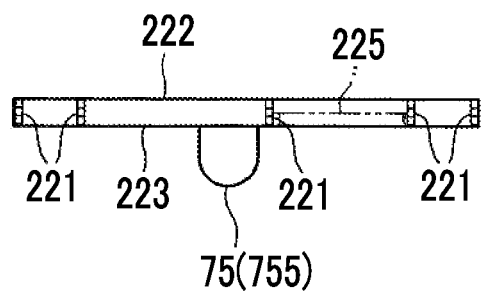
FIG. 8C is a schematic cross-sectional view taken along line C-C of the back wall of FIG. 8A.

Next, the first type of back wall 22A is configured as a back wall of which the entire back surface is non-see-through. As illustrated in FIGS. 8A to 8C and the like, the back wall 22A is a divided side wall of a structure configured of a framework material 221 assembled in a required shape, an inner surface material 222 attached to the inside of the framework material 221, and an outer surface material 223 attached to the outside of the framework material 221.

Here, the "non-see-through" refers to a case where an object is not seen at all when the object on the other side of an inclusion is seen through the inclusion at the end of the line of sight. In addition, in this specification and the like, the term "non-see-through" refers to a case where the outline or a detailed portion (information, such as texts) of the object cannot be discriminated due to blurring.

Among these, the framework material 221 is a framework in which structure materials, such as a plurality of columnar members and plate-shaped members, are coupled to each other and is assembled, for example, in a required shape, such as a lattice shape.

The inner surface material 222 is a plate-like (panel-like) plate material having a vertically long, substantially oblong shape of which four corners are circular-arc curvilinear corner portions. The inner surface material 222 is formed of a material, such as metal or synthetic resin. Additionally, at least the surface (inner wall face) of the inner surface material 222, which faces the internal space of the booth, is provided with a required interior material (not illustrated) by pasting or the like. The same applies to inner surface materials in components, such as other divided side walls to be described below, in that the inner surface material is provided with the interior material.

The outer surface material 223 is a plate-like (panel-like) plate material having a vertically long, substantially oblong shape of which four corners are circular-arc curvilinear corner portions.

The outer surface material 223 is formed of a material, such as metal or synthetic resin. Additionally, the surface (outer wall face) of the outer surface material 223, which faces the outside, is provided with a required exterior material (not illustrated) by pasting or the like. The same applies to outer surface materials in components, such as other divided side walls to be described below, in that the outer surface material is provided with the exterior material. Additionally, opaque surface materials are applied as the inner surface material 222 and the outer surface material 223. Moreover, an outer peripheral surface material (not illustrated) is provided in a portion separated by the thickness of a framework material between respective outer peripheral ends of the inner surface material 222 and the outer surface material 223 so as to connect the outer peripheral ends thereof to each other.

The second type of back wall 22B is configured as a see-through back wall. As illustrated in FIG. 3, the back wall 22B has substantially the same configuration as the second type of front wall 21B (FIGS. 7A to 7C and the like). Additionally, the back wall 22B is a divided side wall of a structure configured of an outer peripheral frame (not illustrated) and a see-through fixed back part 226 that is provided at the opening portion of the outer peripheral frame.

Among these, the outer peripheral frame is the same as the outer peripheral frame 211 in the front walls 21A and 21B. The fixed back part 226 has a portion attached to the outer peripheral frame configured as a see-through fixed back part 226A, and is formed using, for example, a colorless transparent or colored transparent tempered glass, similarly to the see-through fixed front part 215A in the front wall 21B.

Additionally, in the back wall 22B, a frame 28B is provided outside the outer peripheral frame thereof similarly to the second type of front wall 21B.

Figure 9A:
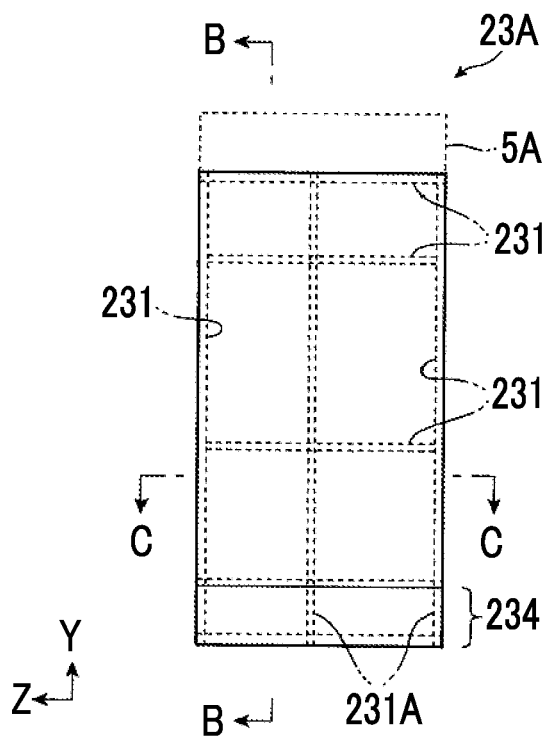
FIG. 9A is a front view illustrating a first type of left side wall.
Figure 9B:
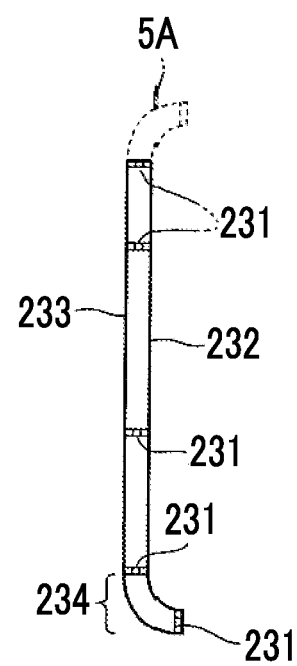
FIG. 9B is a schematic cross-sectional view taken along line B-B of the left side wall of FIG. 9A.
Figure 9C:
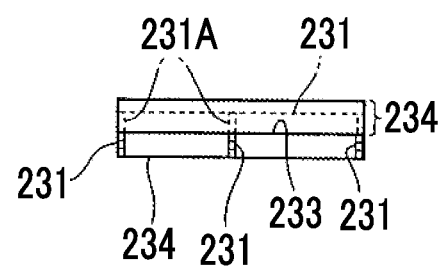
FIG. 9C is a schematic cross-sectional view taken along line C-C of the left side wall of FIG. 9A.

Next, the first type of left side wall 23A is configured as an entirely non-see-through left side wall. As illustrated in FIGS. 9A to 9C and the like, the left side wall 23A is a divided side wall of a structure configured of a framework material 231 assembled in a required shape, an inner surface material 232 attached to the inside of the framework material 231, and an outer surface material 233 attached to the outside of the framework material 231.

Among these, the framework material 231 is a framework having substantially the same configuration as the framework material 221 in the first type of back wall 22A. Additionally, since the left side wall 23A is configured as a lower end part 234 in which a lower end part thereof has a shape curved in a circular arc toward the inside, and a framework material 231A of a shape corresponding to the curved shape is applied as the framework material 231 that forms the lower end part 234 of the curved shape.

A plate material having substantially the same configuration as the inner surface material 222 in the first type of back wall 22A is used as the inner surface material 232. Additionally, a plate material configured of a curved surface that is curved in a circular-arc shape is used as the inner surface material 232 to be provided at the lower end part 234 of the curved shape in the left side wall 23A.

A plate material having substantially the same configuration as the outer surface material 233 in the first type of back wall 22A is used as the outer surface material 223. Among these, a plate material configured of a curved surface that is curved in a circular-arc shape is used as the outer surface material 233 to be provided at the lower end part 234 of the curved shape.

Additionally, opaque surface materials are applied as the inner surface material 232 and the outer surface material 233. Moreover, an outer peripheral surface material (not illustrated) is provided in a portion separated by the thickness of a framework material between respective outer peripheral ends of the inner surface material 232 and the outer surface material 233 so as to connect the outer peripheral ends thereof to each other.

Figure 10A:
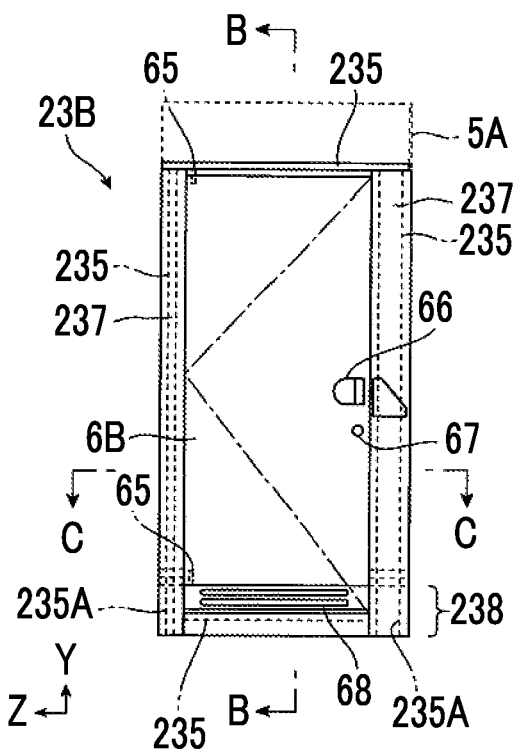
FIG. 10A is a front view illustrating a second type of left side wall.
Figure 10B:
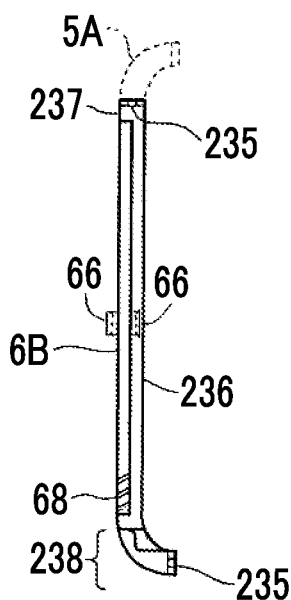
FIG. 10B is a schematic cross-sectional view taken along line B-B of the left side wall of FIG. 10A.
Figure 10C:
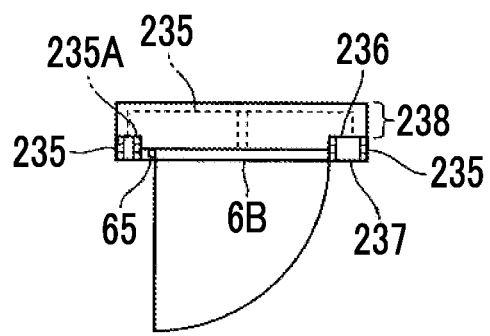
FIG. 10C is a schematic cross-sectional view taken along line C-C of the left side wall of FIG. 10A.

The second type of left side wall 23B is a left side wall of a type in which an entrance/exit door is provided. As illustrated in FIGS. 10A to 10C and the like, the left side wall 23B is a divided side wall of a structure configured of an outer peripheral frame 235 and an entrance/exit door 6B swingably provided at an opening portion (entrance/exit) of the outer peripheral frame 235.

Among these, the outer peripheral frame 235 is a frame material that is assembled in a vertically long, substantially oblong frame shape and is made of, such as, a metallic material, substantially similar to the outer peripheral frame 211 in the first type of front wall 21A. Additionally, since the left side wall 23B is configured as a lower end part 238 in which a lower end part thereof has a shape curved in a circular arc toward the inside, and a framework material 235A of a shape corresponding to the curved shape is applied as the outer peripheral frame 235 that forms the lower end part 238 of the curved shape.

Additionally, the portion (including an inner or outer region) of the outer peripheral frame 235 that is exposed to the outside is provided and covered with an interior material 236, an exterior material 237, and an outer peripheral surface material (not illustrated). Additionally, in this case, in the interior material 236 and the exterior material 237, a plate material configured of a curved surface that is curved in a circular-arc shape is used as the interior material 236 and the exterior material 237 to be provided at the lower end part 238 of the curved shape in the left side wall 23B.

The entrance/exit door 6B is configured as a non-see-through door. As the entrance/exit door 6B, for example, a door serving as fitting can be applied. As the entrance/exit door 6B, specifically, a door of a structure configured of a framework material assembled in a vertically long oblong shape, and an inner surface material and an outer surface material made of a plate material that is provided inside and outside the framework material and is non-see-through is applied.

Additionally, as the entrance/exit door 6B, there is applied a door of a hinged door type that opens and closes an entrance/exit by being swung fulcrums set at an upper side part and a lower side part of an opening portion serving as an entrance/exit of the outer peripheral frame 235. As illustrated in FIG. 10A, the entrance/exit door 6B is supported by a supporting shaft (or a supporting hole) 65 provided at the left end part as viewed from the outside (the left side) among the upper side part and the lower side part of the opening portion of the outer peripheral frame 235, and as illustrated in FIG. 10C, the entrance/exit door 6B is attached so as to swing the supporting shaft (or the supporting hole) 65 as a fulcrum.

Moreover, a right end part of the entrance/exit door 6B is provided with a gripping part 66, such as a handle, which protrudes to the outside and the inside of the door, a locking part 67, a vent hole 68, and the like. The locking part 67 also has, for example, a configuration in which the locking part 67 is configured of an electric key of an electric-powered type that operates with certification information and can be unlocked locked by a user manual operation within the booth, similarly to the locking part 63 in the entrance/exit door 6A.

Figure 11A:
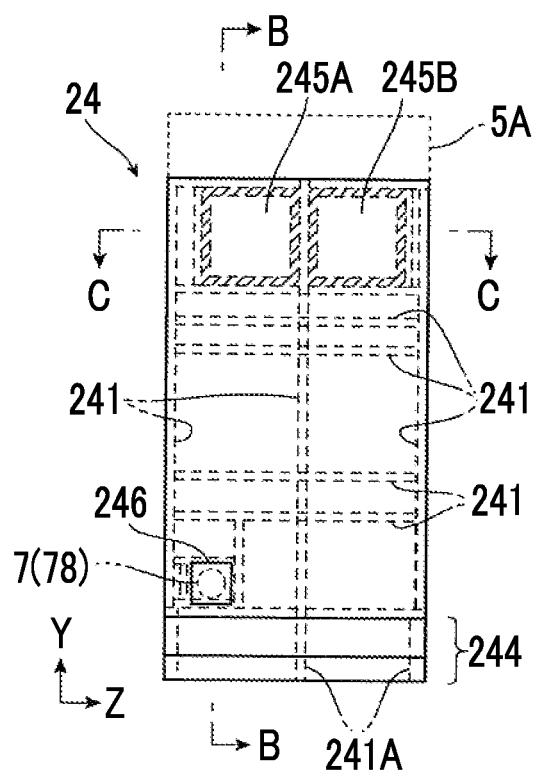
FIG. 11A is a front view illustrated in a state where a right side wall is viewed from the right side.
Figure 11B:
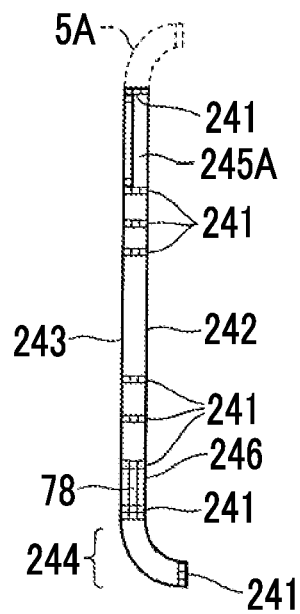
FIG. 11B is a schematic cross-sectional view taken along line B-B of the right side wall of FIG. 11A.
Figure 11C:
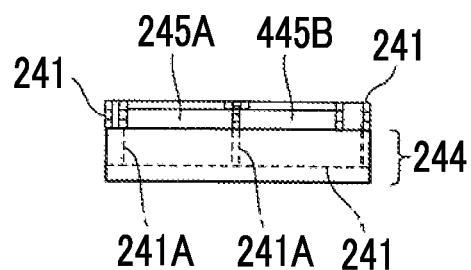
FIG. 11C is a schematic cross-sectional view taken along line C-C of the right side wall of FIG. 11A.

Next, the right side wall 24 is configured as a right side wall of which the entire back surface is non-see-through. As illustrated in FIGS. 11A to 11C and the like, the right side wall 24 is a divided side wall of a structure configured of a framework material 241 assembled in a required shape, an inner surface material 242 attached to the inside of the framework material 241, and an outer surface material 243 attached to the outside of the framework material 241.

Among these, the framework material 241 is a framework having substantially the same configuration as the framework material 231 in the left side wall 23A. Additionally, since the right side wall 24 is configured as a lower end part 244 in which a lower end part thereof has a shape curved in a circular arc toward the inside, and a framework material 241A of a shape corresponding to the curved shape is applied as the framework material 241 that forms the lower end part 244 of the curved shape.

A plate material having substantially the same configuration as the inner surface material 232 in the left side wall 23A is used as the inner surface material 242. Additionally, in the inner surface material 242, a plate material configured of a curved surface that is curved in a circular-arc shape is used as the inner surface material 242 to be provided at the lower end part 244 of the curved shape in the right side wall 24.

A plate material having substantially the same configuration as the outer surface material 233 in the left side wall 23A is used as the outer surface material 243. Among these, a plate material configured of a curved surface that is curved in a circular-arc shape is used as the outer surface material 243 to be provided at the lower end part 244 of the curved shape.

Additionally, opaque surface materials are applied as the inner surface material 242 and the outer surface material 243. Moreover, an outer peripheral surface material (not illustrated) is provided in a portion separated by the thickness of a framework material between respective outer peripheral ends of the inner surface material 242 and the outer surface material 243 so as to connect the outer peripheral ends thereof to each other.

Additionally, as illustrated in FIGS. 11A to 11C and the like, an upper part of the right side wall 24 is provided with two housing parts 245A and 245B that have recess spaces that open to the inside and house required facility articles, and a lower part thereof is provided with a vent hole 246.

The two housing parts 245A and 245B are hollow portions that are formed by providing an opening in a portion of the inner surface material 242 in the right side wall 24 and fitting a frame material into a rectangular compartment portion that is formed by being surrounded with the framework material 241 in conformity with the opening. Additionally, the housing parts 245A and 245B are configured to be blocked with a transparent or opaque lid (not illustrated).

Additionally, the vent hole 246 is a portion that is provided by penetrating portions of the inner surface material 242 and the outer surface material 243 in the right side wall 24 in a rectangular shape.

Next, as illustrated in FIGS. 12A to 12C and the like, the floor material 3 is configured of a framework material 311, a floor plate 312 attached an upper side of the framework material 311, and a peripheral wall material 313 that surrounds the framework material 311 in the state of being made to protrude downward around the framework material 311.

Among these, the framework material 311 is, for example, a framework having substantially the same configuration as the framework material 231 in the left side wall 23A.

In the framework material 311, four corners in an outer peripheral portion of a framework constructed in an oblong shape are provided with height adjustment legs (adjusters) 35 to be fixedly installed after adjusting a height with respect to the floor material 3 and eventually a floor surface 200 for installing the booths 1A and 1B.

The floor plate 312 is a plate material made of a material, such as metal, synthetic resin, or wood. Face panels, such as a tile carpet, are disposed on a top surface (floor surface) of the floor plate 312 in accordance with applications or the like.

Additionally, casters 36 capable of being used in a case where the floor material 3 alone or the booths 1A and 1B are moved are provided inside four corners in a bottom surface of the floor plate 312.

Figure 13A:
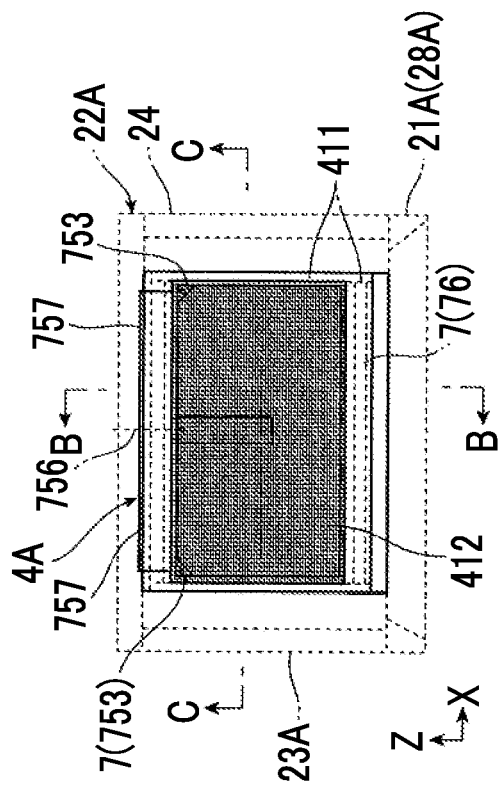
FIG. 13A is a plan view illustrated in a state where a first type ceiling material is viewed from above.
Figure 13C:
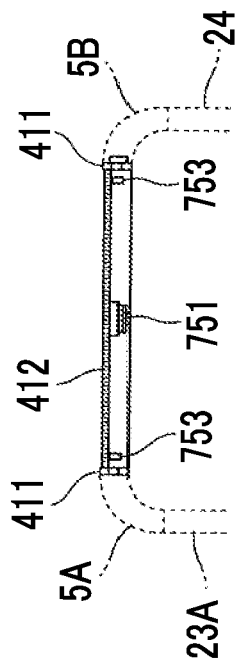
FIG. 13C is a schematic cross-sectional view taken along line C-C of the ceiling material of FIG. 13A.
Figure 13B:
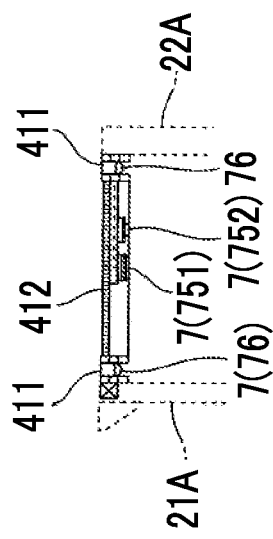
FIG. 13B is a schematic cross-sectional view taken along line B-B of the ceiling material FIG. 13A.

Next, the first type of ceiling material 4A is configured as an open type ceiling material. As illustrated in FIGS. 13A to 13C and the like, the ceiling material 4A has a structure configured of an outer peripheral frame 411 constructed by an oblong frame shape and an opening type member 412 attached to an opening portion of the outer peripheral frame 411.

Among these, the outer peripheral frame 411 is, for example, a frame material that is assembled in a substantially oblong frame shape and is made of, such as, a metallic material, substantially similar to the outer peripheral frame 211 in the first type of front wall 21A.

Additionally, the opening type member 412 is a member made of a material, such as metal or synthetic resin, which is provided with a plurality of opening portions. As the opening type member 412, for example, a member, such as a lattice panel (surface lattice) or a mesh panel, is applied. In Exemplary Embodiment 1, a lattice panel in which rectangular opening portions partitioned in a grid pattern are formed is applied. The opening type member 412 functions not only as a ventilation part but also a lighting part.

As illustrated in FIG. 3, the second type of ceiling material 4B is configured as a sealed-type ceiling material. The ceiling material 4B is, for example, a ceiling material of a structure configured of a framework material (not illustrated), an inner surface material provided on a bottom surface side of the framework material, and an outer surface material provided on a top surface side of the framework material.

Among these, the framework material has substantially the same configuration as the framework material 231 in the first type of left side wall 23A. Additionally, the inner surface material and the outer surface material are plate materials made of a non-transparent material that is made non-see-through. As the inner surface material, an interior material is provided in accordance with use conditions. As the outer surface material, an exterior material is provided in accordance with use conditions.

Finally, as described above, both of the corner portion materials 5A and 5B are structure materials that are capable of being matched with a curved surface shape of upper two corners among the four corners, having the curved surface shape, of the front wall 21 and the back wall 22 and that allow coupling at least between the left side wall 23, the right side wall 24, and the ceiling material 4.

The corner portion materials 5A and 5B are configured of a framework material (not illustrated), and an inner surface material and an outer surface material inside and outside the framework material. Additionally, the two types of corner portion materials 5A and 5B are different from each other only in that the portions joined and fixed to the front wall 21 and the back wall 22 are disposed at mutually opposed end parts, and have the same configuration regarding other points.

Configuration of Facility Articles in Respective Components of Kit

Facility articles 7 as will be described below are provided in the respective components of the kit 10 capable of constructing the booths 1A and 1B.

In Exemplary Embodiment 1, the two booths 1A and 1B are configured to become booths having the same facility articles 7. Here, the entrance/exit door 6 will be temporarily excluded from the facility articles 7 and will be described.

First, as illustrated in FIG. 1, FIG. 2, FIG. 14A, FIG. 15A, FIG. 16A, and the like, an inner wall face of the right side wall 24 in the booths 1A and 1B is provided with a desk top plate 71 and a monitor screen device 72 that are examples of the facility articles 7.

The desk top plate 71 is installed in a fixed state so as to be capable of being always used. However, the desk top plate 71 may be installed so as to be capable of being brought into, for example, a housed state (temporarily folded state) in a state of being pressed against an inner wall face. The monitor screen device 72 is used in order to project a main image output from a device, such as a notebook PC or a tablet, which is brought by a user, on a large screen. The monitor screen device 72 is attached such that the angle or orientation thereof in an upward-downward direction or a horizontal direction can be finely adjusted.

Figure 15A:
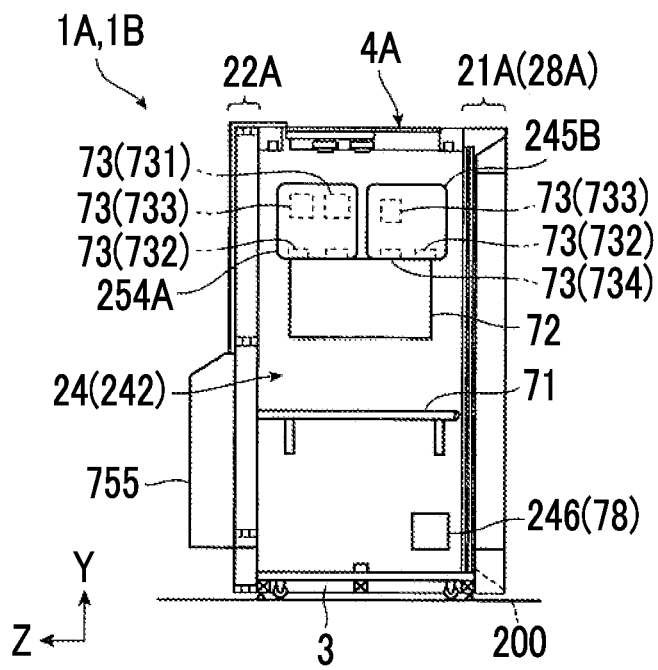
FIG. 15A is a schematic longitudinal cross-sectional view illustrating the booth of FIG. 1
Figure 15B:
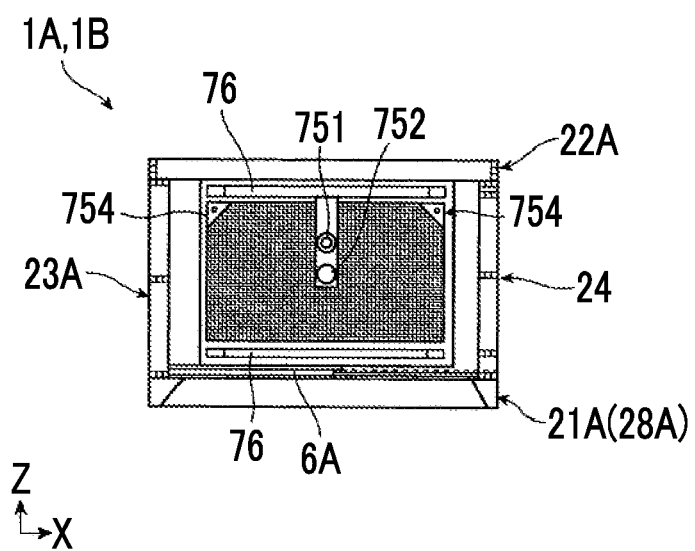
FIG. 15B is a schematic cross-sectional view taken along line B-B of the booth of FIG. 15A.

Additionally, as illustrated in FIG. 1, FIG. 2, FIG. 15A, and the like, some of electrical devices 73 that are examples of the facility articles 7 are distributed and provided to the housing parts 245A and 245B of the right side wall 24.

Additionally, as illustrated in FIGS. 14A to 14C or FIGS. 16A to 16C, a connection tap 77, serving as an example of the facility articles 7, which performs power supply or connection with a connecting terminal, is provided at a portion of an inner wall face of the right side wall 24 or on both sides of the desk top plate 71.

Moreover, as illustrated in FIG. 11, the vent hole 246 in the right side wall 24 may be provided with a ventilation fan 78 for ventilation, which is one example of the facility articles 7.

The electrical devices 73 are, for example, an information telecommunications devices 731, such as a wired or wireless router and a gateway, power source devices 732, such as a power source distributor and a potential transformer, a control device 733 that controls the operation of the information telecommunications devices 731, the power source devices 732, the monitor screen device 72, and other devices to be described below, and a power source management device 734 that performs management by performing supply and stop of electrical power to specific electrical devices. The other devices in the control device 733 are, for example, electrical locks of the locking parts 63 and 66 in the entrance/exit door 6A and 6B, and a display input box (82) to be described below. Additionally, although the specific electrical devices in the power source management device 734 are, for example, the monitor screen device 72, the connection tap 77, a lighting fixture 76, and the ventilation fan 78, and the like, the specific electrical devices are not particularly limited to these.

The electrical devices 73, such as the information telecommunications devices 731, the power source devices 732, the control device 733, and the power source management device 734, are disposed in the housing parts 245A and 245B in a state where these devices are unitized and classified in accordance with types and functions. By disposing the electrical devices 73 in this way, electrical wiring and functions can be intensified.

Additionally, as the connection tap 77, for example, a terminal component or a terminal, such as a power receptacle, a charging connecting terminal, or a connecting terminal for inputting an image or voice signals, is disposed. The connection tap 77 is connected to the power source devices 732 and the control device 733 (monitor screen device 72) of the above electrical devices 73.

Next, as illustrated in FIG. 1 to FIG. 3, FIGS. 12A to 12C, FIGS. 14A to 14C, FIG. 16A to 16C, and the like, a chair 74, which is an example of the facility articles 7, is provided at a substantially central position on a top surface of the floor plate 312 in the booths 1A and 1B.

The chair 74 is a chair for a user using the booths 1A and 1B (internal space) to sit down.

Additionally, a supporting leg 74a of in the chair 74 is fixed to a fixture 37 provided so as to protrude toward the substantially central position on the top surface of the floor plate 312. Accordingly, the position of the chair 74 is fixed. Additionally, the chair 74 is disposed and fixed at a position where a user sits confronting the desk top plate 71 or the monitor screen device 72. Moreover, the chair 74 is a mechanism capable of finely adjusting the height of a seat face, the angle of a backrest, and the like on the supporting leg 74a.

Next, as illustrated in FIGS. 13A to 15C, FIGS. 15A to 15C, and the like, sensors 751 and 752 and an extinguishing medium discharge part 753, which are some of extinguishing facility articles 75 that are examples of the facility articles 7, are provided inside the ceiling material 4A in the booths 1A and 1B.

Additionally, as illustrated in FIGS. 4A to 4E, FIGS. 5A to 5E, FIGS. 8A to 9C, FIGS. 14A to 14C, FIGS. 16A to 16C, and the like, an extinguishing medium supply device 755, which is one of the extinguishing facility articles 75, is attached to an outer wall face of the back wall 22B in the booths 1A and 1B.

The sensors 751 and 752 are, for example, smoke sensors, heat sensors, or the like and attached to, for example, an inner surface (ceiling surface) of the opening type member 412. In addition, the heat sensor 752 is provided with, for example, the function of a motion sensor that detects the presence of a user who has entered the internal space of the booth. As the motion sensor, one provided on the divided side wall or the ceiling material 4 independently from the sensor may be provided. Additionally, the extinguishing medium discharge part 753 is, for example, a nozzle that discharges an extinguishing medium, and is attached to a corner of the opening type member 412.

The sensors 751 and 752 are connected to the extinguishing medium supply device 755 attached to the back wall 22A via a conductive line 756, and actuates the extinguishing medium supply device 755 using detected information. Additionally, the extinguishing medium discharge part 753 is connected to the extinguishing medium supply device 755 via a pipe 757, and is adapted to discharge the extinguishing medium supplied from the extinguishing medium supply device 755 into the internal space of the booth 1.

Additionally, in the ceiling material 4A, as illustrated in FIGS. 13A to 13C, FIGS. 15A to 15C, and the like, a portion of the outer peripheral frame 411 is provided with the lighting fixture 76 that is an example of the facility articles 7.

The lighting fixture 76 is a facility article that illuminates the internal space of the booth. The lighting fixture 76 in Exemplary Embodiment 1 is attached in a state where the lighting fixture is embedded in a groove portion provided in a portion of the lower surface of the outer peripheral frame 411.

Also in the second type of ceiling material 4B, the sensors 751 and 752 and the extinguishing medium discharge part 753, which are some of the extinguishing facility articles 75 that are examples of the facility articles 7 (not illustrated), are provided, for example, in a portion of the inner surface material, similarly to the ceiling material 4A. Additionally, the lighting fixture 76, which is an example of the facility articles 7 (not illustrated), is provided, for example, in a portion of the framework material of the ceiling material 4B, similarly to the ceiling material 4A.

Next, as illustrated in FIG. 1, FIG. 2, FIG. 14A, FIG. 16A, and the like, the inner wall face of the back wall 22A in the booths 1A and 1B is provided with an operation/adjustment panel part 79 and an advertisement display panel part 81 that are examples of the facility articles 7.

As the operation/adjustment panel part 79, exclusive switches 791, which perform on/off operation and illuminance adjustment of the lighting fixture 76, on/off operation of the advertisement display panel part 81, on/off operation, action adjustment, and the like of other electrical devices, such as the ventilation fan 78, are disposed by a required number. The operation/adjustment panel part 79 is connected to other facility articles 7 to be operated or adjusted, including the electrical devices 73. Additionally, the operation/adjustment panel part 79 is disposed, for example, at a position (a region near the left side wall of the back wall) close to the desk top plate 71 or the chair 74, from a viewpoint of enabling a user to extend his/her hand and use the operation/adjustment panel part 79 easily.

The advertisement display panel part 81 displays advertisement information to notify a user of the booth as display contents, such as texts and images. The advertisement display panel part 81 is configured of a display device, such as a liquid crystal panel. The advertisement display panel part 81 is connected to, for example, the information telecommunications devices 731 and the control device 733 in the electrical devices 73, and is operated by performing reception and control of the advertisement information.

Next, as illustrated in FIG. 1, FIG. 2, FIGS. 4A to 4E, FIGS. 5A to 5E, and the like, the left side wall 23A in the booth 1A and the left side wall 23B in the booth 1B are provided with the display input box 82 that is an example of the facility articles 7.

The display input box 82 is provided with a function of performing required operations, such display, input, and reading, by being operated by a user of the booth or a person who is interested in using the booth. The display input box 82 is configured such that functional portions required for the operation of a display unit, an input unit, a reading unit, and the like are disposed therein.

Figure 14A:
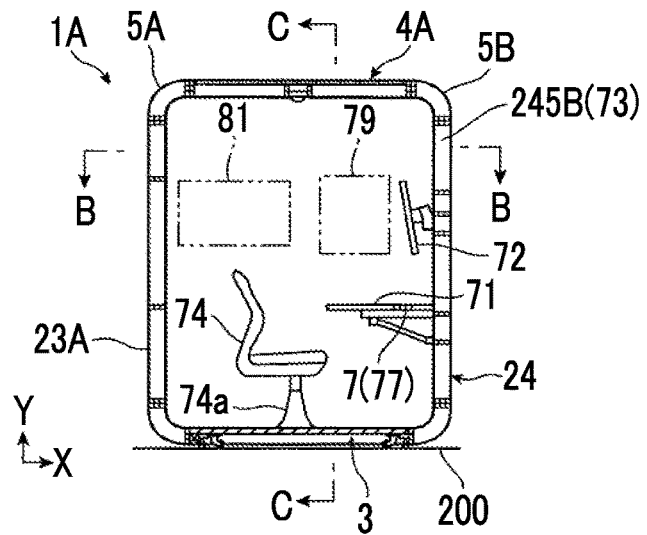
FIG. 14A is a schematic longitudinal cross-sectional view illustrating the booth of FIG. 1.
Figure 14B:
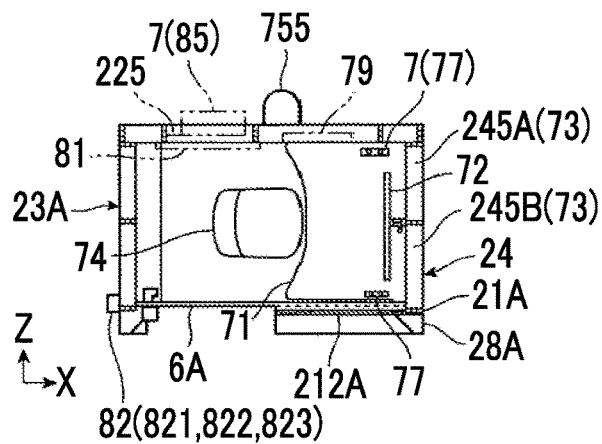
FIG. 14B is a schematic cross-sectional view taken along line B-B of the booth of FIG. 14A.
Figure 14C:
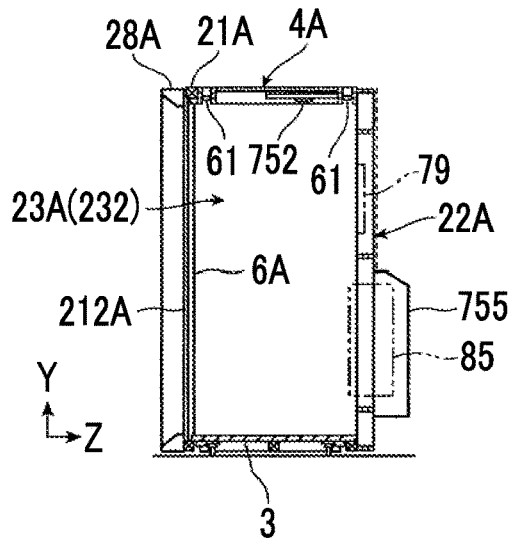
FIG. 14C is a schematic cross-sectional view taken along line C-C of the booth of FIG. 14A.
Figure 16A:
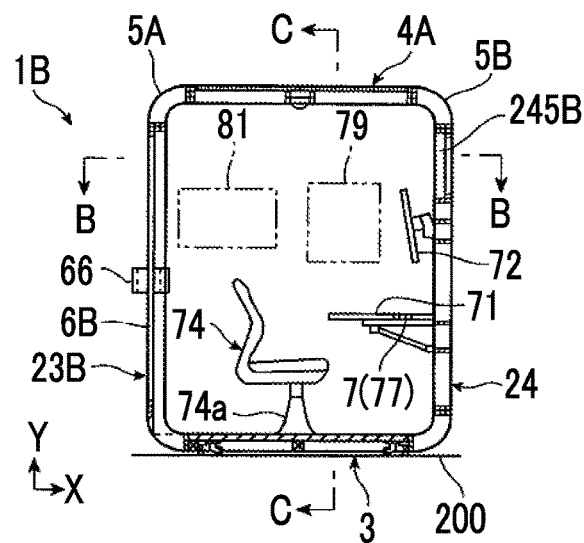
FIG. 16A is a schematic longitudinal cross-sectional view illustrating the booth of FIG. 2.
Figure 16B:
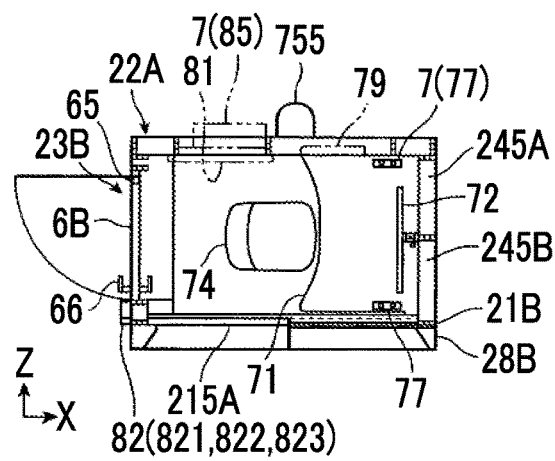
FIG. 16B is a schematic cross-sectional view taken along line B-B of the booth of FIG. 16A.
Figure 16C:
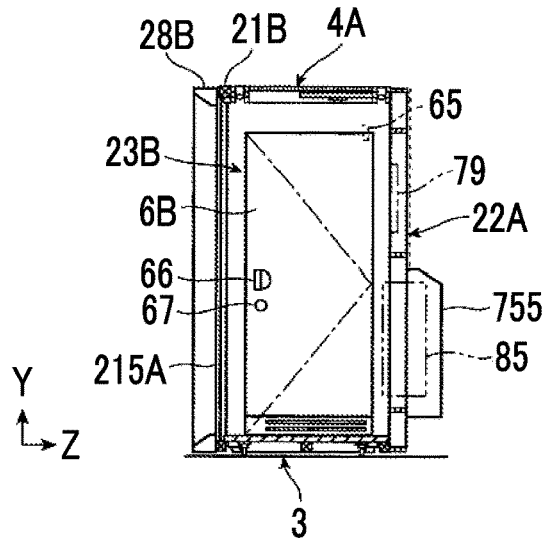
FIG. 16C is a schematic cross-sectional view taken along line C-C of the booth of FIG. 16A.

Additionally, as illustrated in FIG. 14B and FIG. 16B, the display input box 82 includes a certification unit 821 that certifies a user, and a payment unit 822 for allowing the user to pay the fee. A certification method and a payment method are appropriately selected depending on installation environment or the like. Moreover, the display input box 82 can also be configured by adding, for example, a reception unit 823 or the like that checks the use situation of the booth or performs reservation of use in addition to this.

In addition, the power source management device 734 is operated so as to perform supply or stop of the electrical power to the specific electrical devices, on the basis of the detection information of the certification unit 821 in the display input box 82 and the detection information of the motion sensor in the heat sensors 752 in the ceiling material 4A and 4B.

Assembling of Booth

In a case where the booth 1A is one booth that is first constructed using the components of the kit 10, as illustrated in FIG. 1, FIGS. 4A to 4E, and the like, the front wall 21A, the back wall 22A, the left side wall 23A, and the right side wall 24, which are divided side walls of the side wall 2, and the floor material 3, the ceiling material 4A, and the corner portion materials 5A and 5B are assembled by being coupled and fixed to each other with fixing means capable of fixing and releasing bolts, nuts, and the like in respective portions of outer peripheral frames and framework materials that are joined to each other.

In this case, a procedure of the assembling includes, for example, a turn in which the corner portion materials 5A and 5B and the ceiling material 4A are attached, coupled, and fixed in this order after the front wall 21A, the back wall 22A, the left side wall 23A, and the right side wall 24 are joined, coupled, and fixed to the floor material 3.

Meanwhile, in a case where the booth 1B is one booth that is first constructed using the components of the kit 10, as illustrated in FIG. 2, FIGS. 5A to 5E, and the like, the front wall 21B, the back wall 22A, the left side wall 23B, and the right side wall 24, which are divided side walls of the side wall 2, and the floor material 3, the ceiling material 4A, and the corner portion materials 5A and 5B are assembled by being coupled and fixed to each other with fixing means capable of fixing and releasing bolts, nuts, and the like in respective portions of outer peripheral frames and framework materials that are joined to each other.

Assembling by Replacement of Side Wall of Booth

In a case where the booth 1A is previously selected and assembled from the components of the kit 10, the booth 1B can also be assembled by unfixing and then removing the fixing means capable of fixing and releasing the front wall 21A and the left side wall 23A in the booth 1A, and then coupling and fixing the front wall 21B and the left side wall 23B, which are components of the kit 10, again by the fixing means, instead of the front wall 21A and the left side wall 23A.

In a case where the booth 1B is previously selected and assembled from the components of the kit 10, one booth 1A can also be assembled by unfixing and removing the fixing means capable of fixing and releasing the front wall 21B and the left side wall 23B in the booth 1B, and then coupling and fixing the front wall 21A and the left side wall 23A, which are components of the kit 10, again by the fixing means, instead of the front wall 21B and the left side wall 23B.

In a case where the two booths 1A and 1B are compared with each other before and after the assembling thereof, the position and type of entrance/exit door 6 is changed, and thereby, a booth in which some of the configuration contents are different is obtained.

Additionally, as illustrated in FIG. 1, FIG. 14A to 14C, FIGS. 15A to 15C, and the like, the assembled booth 1A becomes a booth in which a cubical internal space (quadrangular prism) surrounded by the front wall 21A, the back wall 22A, the left side wall 23A, and the right side wall 24 that are divided side walls of the side wall 2 is formed.

Additionally, in the booth 1A, the internal space thereof becomes an internal space in a state where the top and the bottom thereof are surrounded by the floor material 3 and the ceiling material 4A.

Additionally, as illustrated in FIG. 2, FIGS. 15A to 15C, FIGS. 16A to 16C, and the like, the assembled booth 1B becomes a booth in which an internal space, which is surrounded by the front wall 21B, the back wall 22A, the left side wall 23B, and the right side wall 24 that are divided side walls of the side wall 2, and has a cubical (quadrangular prismatic) shape substantially similar to the internal space of the booth 1A, is formed. Additionally, also in the booth 1B, the internal space thereof becomes an internal space in a state where the top and the bottom thereof are also surrounded by the floor material 3 and the ceiling material 4A, similarly to the internal space of the booth 1A.

Use of Booth

Although the two booths 1A and 1B are used as booths that can be used by a user's reservation as will be described below, the ways of entrance and exit of a user with respect to respective internal spaces thereof are different from each other in a case where both the booths 1A and 1B are contrasted with each other.

That is, in the case of the booth 1A, a user slides the sliding-door type entrance/exit door 6A at the front wall 21A from the outside of the booth to the right side in the drawings, the entrance/exit opening to the left half of the front wall 21A is brought into an open state and enters the internal space from the front side of the booth 1A. Additionally, as a user slides the entrance/exit door 6A with respect to the left side in the drawing from the inside of the booth, the entrance/exit of the front wall 21A is brought into an open state, and the user goes out from the internal space to the front side of the booth 1A.

In contrast, in the case of the booth 1B, a user swings the hinged-door type entrance/exit door 6B at the left side wall 23B from the outside of the booth to the outside of the left side wall 23B, the entrance/exit in which almost all of the left side wall 23B opens is brought into an open state and the user enters the internal space from the left side of the booth 1B. Additionally, as a user swings the entrance/exit door 6B toward the outside of the booth from the inside of the booth, the entrance/exit of the left side wall 23B is brought into an open state, and the user goes out from the internal space to the left side of the booth 1B.

Incidentally, in both the booths 1A and 1B, it is possible for a user to undergo a certification procedure by the certification unit 821 in the display input box 82 in front of the booths 1A and 1B, and open the entrance/exit doors 6A and 6B for the first time when the electrical lock of the locking part 63 or 67 in each of the entrance/exit doors 6A and 6B is unlocked on the basis of the detection information of which the certification is approved.

Additionally, in a case where the two booths 1A and 1B are contrasted with each other, the states of the respective internal spaces and the contents of the facility articles are substantially common.

First, the internal spaces in the booths 1A and 1B are the front walls 21A and 21B that allow the front of each booth to be see-through. For this reason, the internal spaces in the booths 1A and 1B are open spaces that do not easily give a user a blocking feeling of being surrounded by the four divided side walls 21A, 22A, 23A, and 24 (or the divided side walls 21B, 22A, 23B, and 24). Meanwhile, since the internal spaces are surrounded in all directions, it is possible for a user to comfortably perform a required task in the internal spaces blocked from the outsides of the booths.

Additionally, in the booths 1A and 1B, as illustrated in FIGS. 6A to 6C and FIGS. 7A to 7C, the see-through portions of the front walls 21A and 21B are configured using tempered glass 213. For this reason, the front walls 21A and 21B in the booths 1A and 1B become see-through divided side walls also having strength, and also ensures safety.

In addition, in the booths 1A and 1B, almost all the front walls 21A and 21B are configured to be see-through. Thus, in a case where the booths have a use form in which a user wants to avoid the gaze of a passerby who passes around each booth, it is possible to cope with this as follows.

One is to replace the front walls 21A and 21B that are configured to be substantially entirely see-through with the front wall 21 that is configured to be entirely non-see-through. Accordingly, the configuration contents of the booths 1A and 1B are changed, and particularly, the passerby's gaze with respect to the internal space is blocked.

Incidentally, in the booths 1A and 1B, it is desirable that a portion of a divided side wall is provided with a see-through portion that allows the presence/absence or state of a user within an internal space to be easily checked from the outside of a booth. Meanwhile, for example, when a user is within an internal space, in a case where a display unit for performing a display "In use" to the outside of a booth or a unit for allowing the presence/absence or state of a user to be separately checked is adopted, configuration contents in which a divided side wall is not provided with a see-through portion may be adopted.

Additionally, as illustrated from FIG. 1 to FIG. 3, the other one is to replace the inner wall faces of the front walls 21A and 21B having a substantially entirely see-through configuration with the front wall 21 of a type in which a sight-line blocking sheet or film 91, which blocks a gaze and is made to be non-see-through, is pasted. Accordingly, the configuration contents of the booths 1A and 1B are changed, and the passerby's gaze is blocked.

In this case, as the sight-line blocking sheet or film 91, an opaque material, a material having characteristics of a ground glass style, or the like is applied. Additionally, the position or size (area) that the sight-line blocking sheet or film 91 is applied is optional because the position or size varies depending on use conditions.

In a case where the above measures are adopted, it is possible for users of the booths 1A and 1B to concentrate on (devote to) a task without paying his/her attention to the public eye. Additionally, a user no longer has a concern that information under tasking may be read by a passerby or the like from the outside of the booth and may leak, and security against the information leak is guaranteed.

Next, in the internal spaces in the booths 1A and 1B, the position of the chair 74 on the floor material 3 is fixed so as to confront the inner wall face of the right side wall 24 where the desk top plate 71, the monitor screen device 72, the electrical devices 73 and the like are provided.

For this reason, in the internal spaces in the booths 1A and 1B, in a case where a user sits on the chair 74, the user automatically confronts the desk top plate 71, the monitor screen device 72, or the like in the inner wall face of the right side wall 24. Accordingly, a user easily starts a task on the desk top plate 71. Additionally, a user also easily starts an operation task that is required in a case where the monitor screen device 72, the electrical devices 73 (information telecommunications devices 731, or the like) is used.

Additionally, in the internal spaces in the booths 1A and 1B, in a case where a user undergoes the certification procedure by the certification unit 821 and is detected by the motion sensor or the like in the heat sensors 752 in the ceiling material 4A, the power source management device 734 housed in the housing part 245B of the right side wall 24 is operated as follows.

That is, in the internal spaces of the booths 1A and 1B in this case, electrical power is automatically supplied to electrical devices, such as the monitor screen device 72, the lighting fixture 76, the connection tap 77, and the ventilation fan 78, by the power source management device 734, and the electrical devices are brought into a started state or an available state. As a result, for example, the internal spaces become bright due to illumination, active ventilation is performed and the internals spaces become comfortable, and the monitor screen device 72 or the connection tap 77 is made available.

Additionally, in the internal spaces in the booths 1A and 1B, in a case where the presence of a user is not detected in a required time by the motion sensor after a user has entered the internal spaces, the power source management device 734 is operated as follows.

That is, in the internal spaces of the booths 1A and 1B in this case, the supply of electrical power to the earlier electrical devices is automatically stopped by the power source management device 734, and the electrical devices are brought into a stopped state or an unavailable state. Accordingly, the supply of electric power to the booths 1A and 1B is appropriately managed, and the consumption of electric power by the electrical devices is suppressed.

From the above, since the supply of electrical power to some electrical devices or the stop of the supply is automatically performed in correspondence with the entrance and exit of a user with respect to the internal spaces, user's convenience is ensured. Additionally, since it is possible for a user to perform communication by the Internet via the information telecommunications devices 731 also within the internal spaces, it is possible to comfortably perform exchange of information with the outside of the booth, and it is also possible to enrich task contents.

Next, in both the booths 1A and 1B, the open-type ceiling material 4A including the opening type member 412 is used.

For this reason, in the internal spaces in the booths 1A and 1B, slight openness is obtained also on the upper sides of the internal spaces, and ventilation through the opening type member 412 is performed.

In addition, in the booths 1A and 1B, it is possible to replace the open-type ceiling material 4A with the sealed-type ceiling material 4B in the kit 10.

Accordingly, in the booths 1A and 1B, it is possible to change the configuration contents of the ceiling material.

Additionally, the internal spaces of the booths 1A and 1B after being replaced with the sealed-type ceiling material 4B are improved, for example, in sound insulating performance and heat insulation property. For this reason, a user is released from the noise outside of the booth. Additionally, carefree calls, such as eavesdropping by a passerby around a booth, or comfortable music appreciation with no noise is possible. Additionally, the temperature of the internal spaces becomes is easily maintained.

Next, the back wall 22A of the booths 1A and 1B are provided with the operation/adjustment panel part 79 and the advertisement display panel part 81. For this reason, during use, it is possible for a user of each booth to freely perform on/off operation and illuminance adjustment of the lighting fixture 76, on/off operation of the advertisement display panel part 81, on/off operation, action adjustment, and the like of other electrical devices, such as the ventilation fan 78. Accordingly, it is possible for users of the booths to adjust the internal spaces themselves to comfortable spaces.

Additionally, it is possible for users of the booths to obtain the advertisement information to be displayed on the advertisement display panel part 81 during use. Accordingly, the booths 1A and 1B become internal spaces to which an advertisement function for a user is added.

Next, in the booths 1A and 1B, the extinguishing facility articles 75 are disposed on the ceiling material 4A or the like.

For this reason, even if a temperature rise or a fire has occurred irrespective of the presence or absence of a user in the internal spaces of the booths 1A and 1B, that phenomenon is detected by the smoke sensors 751 or the heat sensors 752, and the extinguishing facility articles 75 are operated. Accordingly, the safety of a passerby around each booth including a user of the booth is ensured.

Next, the booths 1A and 1B are provided with the display input box 82.

In this case, in a case where the display input box 82 is provided with the payment unit 822, it is possible for users of the booths 1A and 1B to start to use each booth after the payment of use fee for the booth in front of the booth is finished.

Additionally, in a case where the display input box 82 is provided with the reception unit 823, it is possible to check the use situation of the booth or perform reservation of use, and unexpected promotion of use by passers-by around the booth is achieved. Additionally, extended use of a booth user is also made easy.

Installation Location And Use Pattern of Booth

The booths 1A and 1B are used not only by being installed indoors as mentioned above but also are used by being installed in required locations, such as the outdoors.

In this case, the indoors include, for example, locations, such as rooms in buildings, passages, common spaces, empty floors, and stairs. In this case, the buildings are buildings where the booths 1A and 1B or the like can be installed. As such buildings, for example, there are company buildings, tenant buildings, hospitals, banks, schools (school buildings), public buildings, factories, research institutes, collective housings, and the like.

Additionally, the outdoors are locations where the booths 1A and 1B or the like can be installed outside houses, and are also locations that prevent wind and rain, such as roofs, irrespective of the presence or absence of buildings. Such the outdoors include, for example, locations, such as station premises, concourses, station squares, and the like; premises of companies, public facilities, factories, and the like; passages, plazas, waiting rooms, empty spaces, and the like of exhibition sites, airports, and shopping centers; arcades, semi-fields of office towns, underground passages, and construction sites; sidewalks or plazas in streets; vacant lots; parks; and playgrounds.

Additionally, the booths 1A and 1B are used, for example, as booths (surrounded spaces) that are available for free on a time base after a reservation for use is made, or as booths that are available for a fee on a time basis after a reservation for use is made. In addition, in any cases, a user undergoes identification verification immediately before use.

Moreover, it is also possible to use the booths 1A and 1B in a state where a plurality of booths are coupled side by side. In this case, it is possible to simultaneously use the booths by multiple users in one location.

As the use contents of the internal spaces of the booths 1A and 1B, tasks performed while the desk top plate 71 and chair 74 that are the facility articles 7 are used are targets in principle. Although such tasks are, for example, tasks, such as business tasks, study tasks, and preparation or practice tasks, other types of tasks other than these tasks may be adopted. Incidentally, the booths 1A and 1B can be referred to as, for example, work booths, from a viewpoint that these booths are booths having internal spaces for performing any user's tasks.

Also, the booths 1A and 1B can be replaced with components, such as divided side walls, back walls, and ceiling materials, which are different from each other in the configuration of components, such as divided side walls to be used for constructing the booths or the configuration of the presence/absence, type, and the like of the facility articles 7, a in accordance with use conditions, such as installation locations and use forms of users. Accordingly, it is realized that booths in which changes to configuration contents suited to the use conditions are made are configured or booths to which the configuration contents suited to the use conditions are added are configured.

Additionally, in a case where the booths 1A and 1B are first installed or in a case where it is required to move the booths 1A and 1B after the installing, it is possible to perform the movement task by using the casters 36 provided on the floor material 3. Additionally, the booths 1A and 1B are brought into a state where the height adjustment legs 35 provided in the floor material 3 are lowered to the floor surface 200 and the casters 36 float up from the floor surface 200 in stages in which the installation positions thereof are determined, and the installation states thereof are fixed. Moreover, in a case where it is necessary to firmly fix the booths 1A and 1B to the installation locations thereof, for example, the booths 1A and 1B are fixed by driving fixtures, such as anchors, into the floor surface 200 in the installation locations from the floor material 3.

Figure 17A:
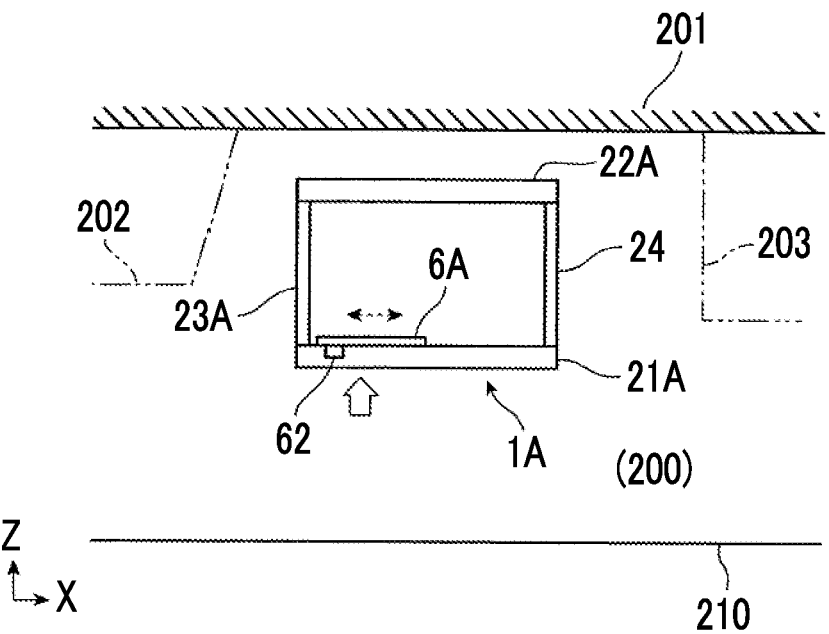
FIG. 17A is a schematic view illustrating an example of the installation location of the booth of FIG. 1.
Figure 17B:
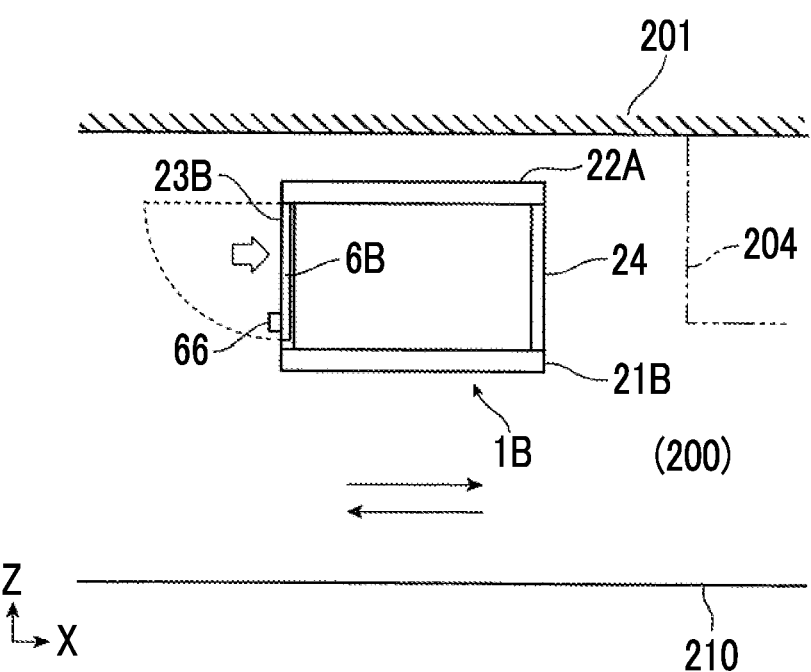
FIG. 17B is a schematic view illustrating an example of the installation location of the booth of FIG. 2.

FIGS. 17A and 17B illustrate examples of the respective installation locations of the booths 1A and 1B.

In the case of the booth 1A, it is possible to install and use the booth 1A, for example, in an installation location illustrated in FIG. 17A. In this case, the installation location is a location where an obstacle 201, such as a wall, is on the back side of the booth 1A, and other obstacles 202 and 203 are present on any of the left side or the right side of the booth 1A. Reference sign 200 in the drawing represents a floor surface in which the booth 1A is installed, and reference sign 210 represents a boundary line with another wall, a large step, or the like that or present with respect to the floor surface 200 to be installed.

In such an installation location, it is difficult for a user to enter and leave the internal space from the back side, the left side, and the right side of the booth 1A. In contrast, the booth 1A has the configuration contents in which the front wall 21A is provided with the sliding-door type entrance/exit door 6A.

Hence, in a case where the booth 1A is installed in such an installation location, a user can easily enter and leave the internal space by approaching the booth 1A from the front side as indicated by an outlined arrow and opening and closing the entrance/exit door 6A in the front wall 21A, and easily uses the booth 1A.

In the case of the booth 1B, it is possible to install and use the booth 1B, for example, at an installation location illustrated in FIG. 17B. In this case, the installation location is a location where the obstacle 201, such as a wall, is on the back side of the booth 1B, and the other obstacle 204 is present also on the right side of the booth 1B. Additionally, the installation location is also a location where a passerby on the front side of the booth 1B frequently comes and goes (an arrow in a leftward-rightward direction illustrated side by side upward and downward in the drawing).

In such an installation location, it is difficult for a user to enter and leave the internal space from the back side, the right side, and the front side of the booth 1B. In contrast, the booth 1B has the configuration contents in which the left side wall 23B is provided with the hinged-door type entrance/exit door 6B.

Hence, in a case where the booth 1B is installed in such an installation location, a user can easily enter and leave the internal space by approaching the booth 1B from the left side as indicated by an outlined arrow and opening and closing the entrance/exit door 6B in the left side wall 23B, and easily uses the booth 1B.

Additionally, in a case where the installation location of the booth 1A is changed to an installation location under the conditions exemplified in FIG. 17B, as mentioned above, the booth 1A can be changed so as to correspond to the configuration contents of the booth 1B illustrated in FIG. 17B by replacing the front wall 21A and the left side wall 23A in the booth 1A with the front wall 21B and the left side wall 23B in the kit 10.

On the contrary, in a case where the installation location of the booth 1B is changed to an installation location under the conditions exemplified in FIG. 17A, as mentioned above, the booth 1B can be changed so as to correspond to the configuration contents of the booth 1A illustrated in FIG. 17A by replacing the front wall 21B and the left side wall 23B in the booth 1B with the front wall 21A and the left side wall 23A in the kit 10.

FIGS. 18A and 18B and FIGS. 19A and 19B illustrate examples of respective installation locations and use patterns of the booth 1B and a plurality of modified booths (1C to 1F).

Figure 18A:
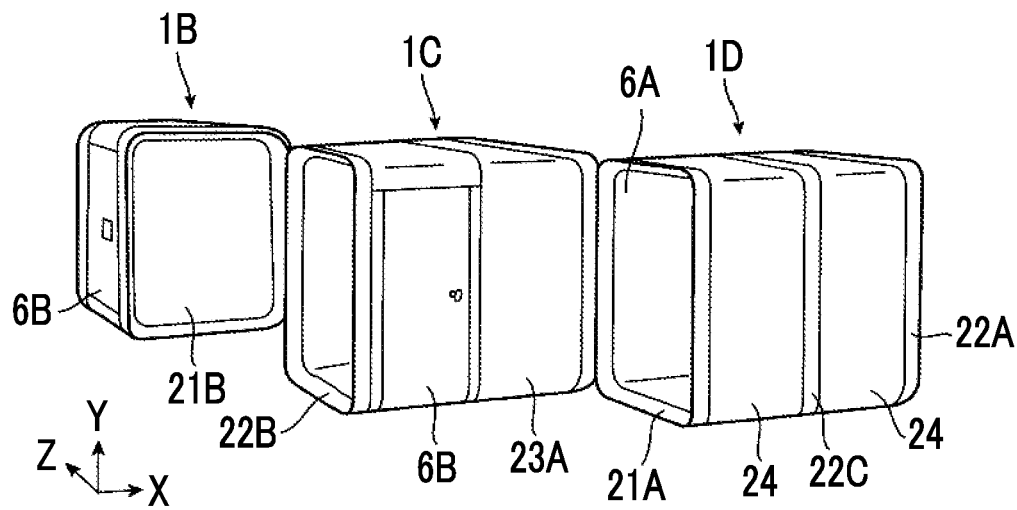
FIG. 18A is a schematic perspective view illustrating installation states of the booth of FIG. 2 and a modified booth.
Figure 18B:
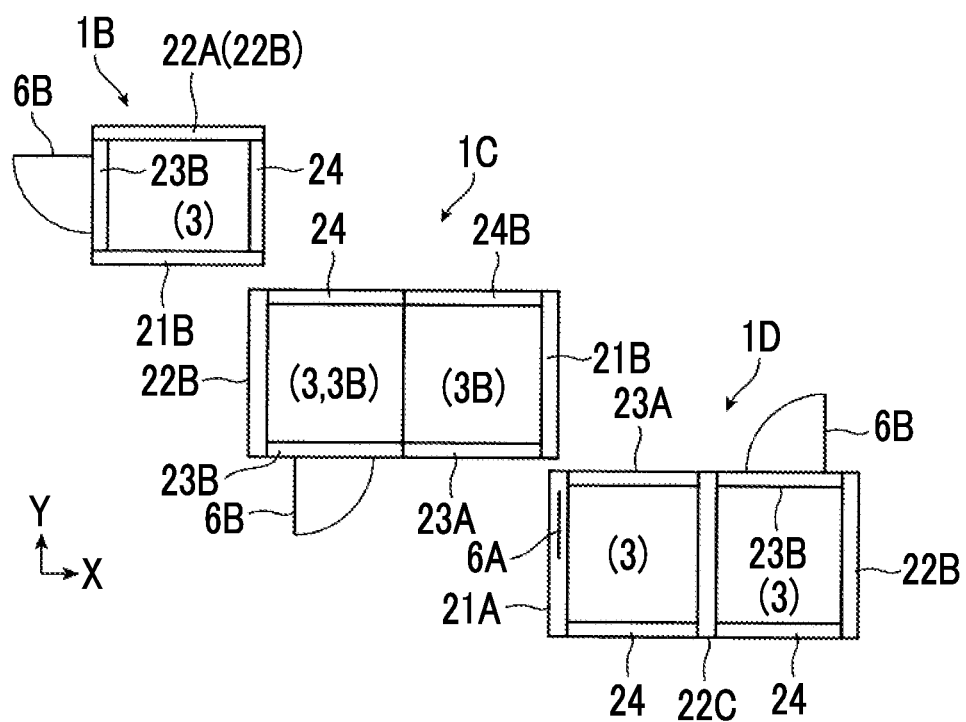
FIG. 18B is a schematic plan view illustrating respective configurations and installation states of the booth of FIG. 18B and the modified booth.

Although FIGS. 18A and 18B illustrate installation states and use patterns of the booth 1B and two modified booths 1C and 19, indoor or outdoor relatively wide locations are assumed as the installation locations.

First, the booth 1B is installed such that the front wall 21B faces an oblique near side (a direction opposite to a direction indicated by arrow Z) of the drawing.

Additionally, the modified booth 1C is an extended type booth in which a portion of configuration contents similar to those of the booth 1B and a portion of configuration contents similar to those of the booth 1A are coupled to each other side by side in a state where there is no partition wall.

That is, the modified booth 1C is assembled as follows, for example. First, a first booth half is assembled by coupling and fixing the back wall 22B having a substantially entirely see-through configuration, the left side wall 23B with the entrance/exit door 6B, and the right side wall 24 to the floor material 3, respectively. Next, a second booth half is assembled by coupling and fixing the front wall 21B having a substantially entirely see-through configuration, the left side wall 23A having a non-see-through configuration with no entrance/exit door, and the second type of right side wall 24B that is not provided with the desk top plate 71, the monitor screen device 72, and the like to the second type of floor material 3B that is not provided with the chair 74, respectively. Finally, the first booth half and the second booth half are coupled and fixed to each other in a state where there is no partition wall. In this case, the assembling procedure is an example and is not limited to this.

The modified booth 1C becomes a booth of a form in which the first booth half and the second booth half having the above respective configuration contents are coupled to each other in a state where there is no divided side wall for partitioning the first and second booth halves from each other (a state where the divided side wall to partition is removed).

The modified booth 1C is installed such that the see-through back wall 22B faces the left side (direction opposite to the direction illustrated by arrow X) of the drawing at a position shifted closer to the oblique near side of the drawing than one end of the front wall 21B of the booth 1B and the entire booth is brought into a laterally facing state as seen from the near side of the drawing.

Moreover, the modified booth 1D is a booth of configuration contents in which a portion of configuration contents similar to those of the booth 1A and a portion of configuration contents similar to those of the booth 1B are coupled to each other side by side in a state where a partition wall is interposed therebetween.

That is, the modified booth 1D is assembled as follows, for example. First, the third booth half is assembled by coupling and fixing the front wall 21A having a see-through configuration with the entrance/exit door 6A, the non-see-through left side wall 23A with no entrance/exit door, the right side wall 24, and a third type of back wall 22C having a non-see-through configuration with no extinguishing medium supply device 755 of the extinguishing facility articles 75 to the floor material 3, respectively. Next, a fourth booth half is assembled by coupling and fixing the back wall 22B having a substantially entirely see-through configuration, the non-see-through left side wall 23B with the entrance/exit door 6B, and the right side wall 24 to the floor material 3, respectively. Finally, the third booth half and the fourth booth half are coupled and fixed to each other in a state where the back wall 22C is used as a partition wall. In this case, the assembling procedure is also an example and is not limited to this.

The modified booth 1D becomes a booth of a type in a state where a divided side wall for partitioning the third and forth booth halves having the above respective configuration contents from each other is installed (a state having the divided side wall to partition).

The modified booth 1D is installed such that the front wall 21A with that entrance/exit door 6A faces the left side of the drawing at a position shifted closer to the oblique near side of the drawing than one end of the front wall 21B of the modified booth 1C and the entire booth is brought into a laterally facing state as seen from the near side of the drawing. In other words, the modified booth 1D is installed in a state where the modified booth 1D is shifted to a side closer to the near side and the right side of the drawing than the modified booth 1C.

The booth 1B and the modified booths 1C and 1D installed in the above respective states are used as follows, for example.

Since a user of the booth 1B is in an installation state where the see-through front wall 21B does not confront the see-through back wall 22B in the adjacent modified booth 1C, it is possible to use the booth 1B without any concern of meeting eyes with a user of the modified booth 1C.

Additionally, the modified booth 1C includes an internal space where the first booth half present on the left side of the drawing include facility articles, such as a chair, a desk top plate, and a monitor screen device. Meanwhile, the modified booth 1C includes a wide internal space where the second booth half present on the right side of the drawing is freely usable without any facility articles, such as a chair, a desk top plate, and a monitor screen device.

For this reason, it is possible for a user of the modified booth 1C to use an internal space where a free space is extended a whole. Additionally, since the internal space is extended, it is also possible for a plurality of users to enter and use the modified booth 1C. Moreover, regarding tasks performed in the internal space of the modified booth 1C, various tasks combined with user's use purposes are possible.

Moreover, since a user of the modified booth 1D is in an installation state where the see-through front wall 21A does not confront the see-through front wall 21B in the modified booth 1C, it is possible to use the modified booth 1D without any concern of meeting eyes with a user of the modified booth 1C.

Additionally, although the modified booth 10 is provided in a state where internal spaces where both of the third booth half present on the left side of the drawing and the fourth booth half present on the right side of the drawing include facility articles, such as a chair, a desk top plate, and a monitor screen device, is made adjacent to each other, the two internal spaces are partitioned from each other by the non-see-through back wall 22C. That is, the modified booth 10 can be used by installing the two booths (internal spaces) in one location.

For this reason, it is possible to use the modified booth 10 in a state where two users are independent from each other without being conscious of each other. Additionally, the two users of the modified booth 10 are kept independent from each other because entrance/exit doors are respectively provided on different divided side walls.

In addition, the configuration contents of the modified booth 1C may be changed by replacing the floor material in the first booth half present on the left side with the second type of floor material 3B having no chair 74 as illustrated in FIG. 18B. In this case, since a wider internal space is formed in the modified booth 1C, the ways of use or the allowable number of users can be increased.

Additionally, even in the modified booths 1C and 1D, at least one of divided side walls, floor materials, or ceiling materials thereof can be replaced with other types of divided side walls, floor materials, or ceiling materials having different configuration contents by the same number or by an increase or decrease as necessary, and changes or additions of the configuration contents are possible.

Moreover, in a case where the booth 1B and the two modified booths 1C and 1D are installed and used outdoors, the sealed-type ceiling material 4B is used as a ceiling material.

Figure 19A:
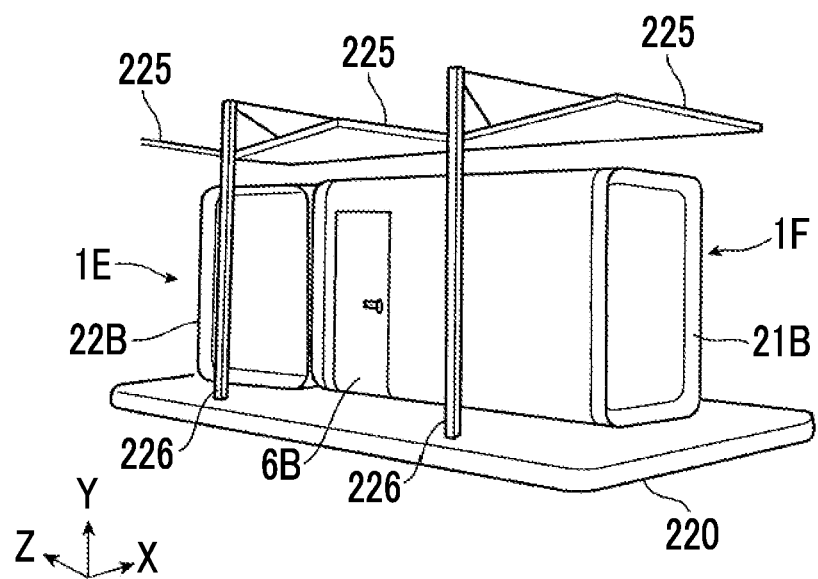
FIG. 19A is a schematic perspective view illustrating the installation location and state of a modified booth.
Figure 19B:
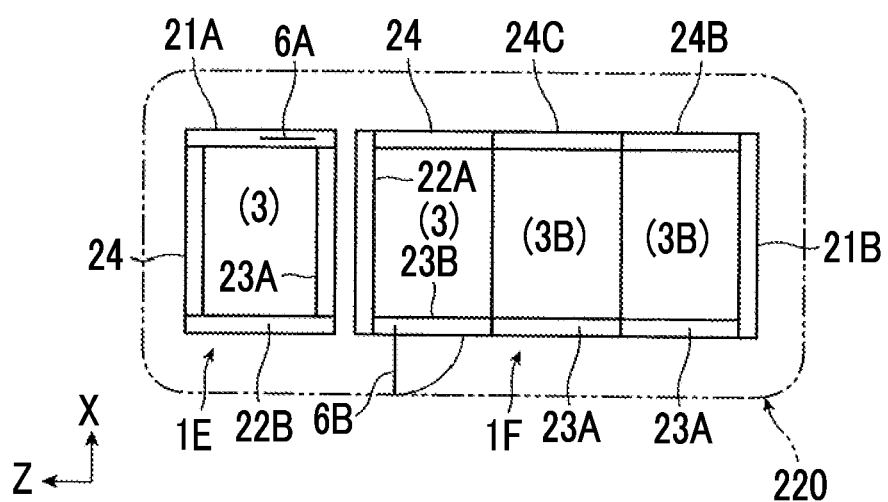
FIG. 19B is a schematic plan view illustrating respective configurations and installation state of the modified booth of FIG. 19A.

Although FIGS. 19A and 19B illustrate installation states and use patterns of two modified booths 1E and 1F, outdoor relatively wide locations are assumed as the installation locations.

Reference sign 220 in FIGS. 19A and 19B represents a raised part that forms a ground one-stage higher than the outdoor ground, reference sign 225 represents a roof disposed above the two modified booths 1E and 1F, and reference sign 226 represents a support post supporting the roof 225. The raised part 220 illustrated in FIGS. 19A and 19B is one in which the planar shape thereof is an elongated substantially oblong shape, and is used as, for example, an installation location that is distinguished from driveways, other grounds, and the like.

First, the modified booth 1E is a booth having configuration contents similar to the booth 1A.

That is, the modified booth 1E has the same configuration as the booth 1A except for a change in which the substantially entirely see-through back wall 22B is applied as a back wall of a divided side wall.

The modified booth 1E is installed such that the front wall 21A with that entrance/exit door 6A faces a right back side of the drawing and the see-through back wall 22B faces a left side and a slightly near side of the drawing.

Additionally, the modified booth 1F is an extended type booth in which a portion of configuration contents similar to those of the booth 1B and a portion of configuration contents similar to those of the modified booth 1C are coupled to each other side by side in a state where there is no partition wall.

That is, the modified booth 1F is assembled as follows, for example. First, a fifth booth half is assembled by coupling and fixing the back wall 22A having a non-see-through configuration, the left side wall 23B with the entrance/exit door 6B, and the right side wall 24 to the floor material 3, respectively. Next, a sixth booth half is assembled by coupling and fixing the left side wall 23A having a substantially non-see-through configuration, and a third type of right side wall 24C having a substantially entirely or partially see-through configuration without providing the desk top plate 71, the monitor screen device 72, and the like to the second type of floor material 3B that is not provided with the chair 74, respectively. Subsequently, a seventh booth half is assembled by coupling and fixing the front wall 21B having a substantially entirely see-through configuration, the left side wall 23A having a non-see-through configuration, and the third type of right side wall 24C to the second type of floor material 3B that is not provided with the chair 74, respectively. Finally, all the fifth booth half, the sixth booth half, and the seventh booth half are coupled and fixed to each other, respectively, in a state where there is no partition wall. In this case, the assembling procedure is an example and is not limited to this.

The modified booth 1F becomes a booth of a type in which three booth halves of the fifth to seventh booth halves having the above respective configuration contents are coupled to each other in a state where there is no divided side wall for partitioning the fifth to seventh booth halves from each other (a state where the divided side wall to partition is removed).

The modified booth 1F is installed such that the non-see-through back wall 22A confronts the non-see-through left side wall 23A with no entrance/exit door of the booth 1E, and the entire booth is brought into a laterally facing state as seen from the near side of the drawing.

The modified booths 1E and 1F installed as described are used as follows, for example.

It is possible for a user of the booth 1E to first enter the booth 1E from the entrance/exit door 6A of the see-through front wall 21A through from the outdoor raised part 220. In this case, since the user of the booth 1E is in an installation state where the left side wall 24 of the booth 1F adjacent to the front wall 21A is present as a non-see-through divided side wall, it is possible for the user of the booth 1E to comfortably enter the internal space of the booth 1E without receiving a gaze from a user within the internal space of the booth 1F.

Additionally, since a user of the booth 1E is in an installation state where the see-through front wall 21A and back wall 22B do not confront the see-through back wall 22B in the adjacent modified booth 1F, it is possible to use the booth 1E without any concern of meeting eyes with a user of the modified booth 1E.

Additionally, the modified booth 1F includes an internal space where the fifth booth half present on the left side of the drawing include facility articles, such as a chair, a desk top plate, and a monitor screen device. Meanwhile, the sixth booth half and the seventh booth half that that are continuously present with no partition wall on the right side from the fifth booth half do not have facility articles, such as a chair, a desk top plate, and a monitor screen device, but include wide internal spaces.

For this reason, it is possible for a user of the modified booth 1F to use an internal space having a margin in width as a whole. Additionally, in the modified booth 1F, since the internal space is extended to 1.5 times longer than the above modified booth 19, it is also possible for more users to enter and use the modified booth 1F at a time. The wide internal space as in the modified booth 1F can also be used as, for example, a small-scale meeting room, a practice hall, or the like.

Moreover, since a user of the modified booth 1F is in an installation state where the see-through front wall 21B or the third type of right side walls 24C confront neither the see-through front wall 21A nor the see-through back wall 22B in the modified booth 1E, it is possible to use the modified booth 1F without any concern of meeting eyes with the user of the modified booth 1E.

Moreover, in a case where the two modified booths 1E and 1F are installed and used outdoors, it is better to use the sealed-type ceiling material 4B as a ceiling material. However, since the roofs 225 that cover the upper sides of the two modified booths 1E and 1F are provided in the installation location illustrated in FIGS. 19A and 19B, it may be possible to use the open-type ceiling material 4A as a ceiling material.

Additionally, in the modified booths 1E and 1F in this case, by replacing the sealed-type ceiling material 4B with the open-type ceiling material 4A or replacing the open-type ceiling material 4A with the sealed-type ceiling material 4B in accordance with environmental conditions to use, it is possible to change the configuration contents of the ceiling material to appropriate configuration contents.

Hence, even in the modified booths 1E and 1F, at least one of divided side walls, floor materials, or ceiling materials thereof can be replaced with other types of divided side walls, floor materials, or ceiling materials having different configuration contents by the same number or by an increase or decrease as necessary, and changes or additions of the configuration contents are possible.

Modification Examples

The invention is not limited to the contents exemplified in Exemplary Embodiment 1 at all, can be variously changed, and also includes, for example, modification examples given below.

The side wall 2 (divided side walls) that constructs the booth 1 may be prepared by making, as the replaceable side wall 2 (divided side walls), one type or a plurality of types of other side walls (divided side walls) having at least one different element among structure, shape, dimension, material, and interior and exterior surface design.

Additionally, the divided side walls provided with the entrance/exit door 6A and 6B may also be providing by making, as replaceable divided side walls, one type of a plurality of types of divided side walls provided another entrance/exit door 6 having at least one different element among the type (for example, a folding door type door), shape, material, position, opening/closing orientation (for example, rightward opening, leftward opening, or the like), and interior and exterior surface design of the entrance/exit door 6A and 6B.

Such replaceable side wall (divided side walls) or the divided side walls provided with the replaceable entrance/exit door 6 are made and prepared in advance as replaceable target components of the kit 10. However, divided side walls of configuration contents required in a case where there is a request for replacement may be made and dealt with depending on circumstances.

In this case, the structure, shape, and dimension of divided side walls that are replacement targets need to be configured with contents that satisfy replaceable conditions. The replaceable conditions are, for example, basic elements in a case where replacement is carried out, such as coupling and fixation with non-replaceable divided side walls or the like, and the unity (continuity or harmony) of a booth as a while.

The structure and material of the replaceable divided side walls also include differences in see-through or non-see-through structure and material, differences in configuration and material suitable for indoor or outdoor installation, and differences in structure resulting from the presence or absence of the frame 28. The shape of the divided side walls are not limited to the flat plate shape, and shapes having a curved surface portion partially or entirely like a two-dimensional curved surface and a three-dimensional curved surface can be adopted. In a case where this shape is changed, it is possible to construct and change booths having variously different external shapes and internal space shapes. The interior and exterior surface design of the divided side walls is coloring, patterns, and the like to be applied to inner surfaces and outer surfaces of the divided side walls. In a case where the interior and exterior surface design is changed, it is possible to construct and change booths that are rich in designability and attract attention.

In addition, the divided side walls may be ones obtained by dividing the side wall 2 into at least two or more. Additionally, in a case where there are other replaceable components, such as the floor material 3 and the ceiling material 4, in addition to the side wall 2, the side wall 2 may be one side wall (but one that can be replaced in units of one side wall) instead of the divided side walls.

Additionally, the side wall 2 (divided side walls) that constructs the booth 1 may be prepared by making, as the replaceable side wall 2 (divided side walls), one type or a plurality of types of other side walls having at least one different element among the presence/absence, type, and of arrangement elements of the facility articles 7.

Such replaceable side wall (divided side walls) having the different configuration contents of the facility articles 7 is made and prepared in advance as replaceable target components of the kit 10. However, divided side walls having required configuration contents of the facility articles 7 in a case where there is a request for replacement may be made and dealt with depending on circumstances.

In this case, the presence or absence of the facility articles 7 means a relationship in a case where a divided side wall of a type in which the facility articles 7 are provided, and a divided side wall of a type in which the facility articles 7 are not provided are prepared. Additionally, in a case where the divided side wall having no facility articles 7 is replaced with the divided side wall with the facility articles 7, it is possible to add the configuration contents of the booth 1. Additionally, the facility articles 7 are not limited to those exemplified above, and other facility articles needed by a user or the like of a booth and facility articles (for example, security camera) required for an administrator (manager) who manages the booth can be adopted.

Specific examples of the presence or absence of the facility articles 7 will be exemplified below.

For example, the left side wall 24 in Exemplary Embodiment 1 has a configuration in which the vent hole 246 thereof is provided with the ventilation fan 78 of the facility articles 7. In this case, the presence or absence of the facility articles 7 also includes, with respect to the left side wall 24 of this configuration, preparing another type of left side wall 24, having a configuration in which the vent hole 246 is not provided with the ventilation fan 78 and a simple hole is provided, so as to make the left side wall 24 replaceable, and preparing another type of left side wall 24, having a configuration in which a ventilation adjustment instrument, such as a louver, is provided, so as make the left side wall 24 replaceable.

Additionally, the non-see-through back wall 22A in Exemplary Embodiment 1 has a configuration in which an air conditioner that is an example of the facility articles 7 is not provided. In this case, the presence or absence of the facility articles 7 also includes, with respect to the back wall 22A of this configuration, preparing another type of back wall 22A having a configuration in which an opening housing part 225 for housing facility articles indicated by a two-dot chain line in FIGS. 8A to 8C are provided, and an air conditioner 85, such as an air-conditioner that is an example of the facility articles 7 as illustrated in the opening housing part 225 in FIGS. 14A to 14C or FIGS. 15A to 15C, and the back wall 22A replaceable.

Moreover, the floor material 3, the ceiling material 4, and the corner portion material 5 that construct the booth 1 may also be prepared by making one type a plurality of types of floor materials 3, ceiling materials 4, corner portion materials 5 having at least one different element among elements of the structure, shape, dimension, material, interior and exterior surface design, and the presence/absence, type, and arrangement of the facility articles 7, as the replaceable floor material 3, ceiling material 4, and corner portion material 5.

Such floor material 3, ceiling material 4, and corner portion material 5 having the different configuration contents are made and prepared in advance as replaceable target components of the kit 10. However, a floor material 3, a ceiling material 4, and a corner portion material 5 having required configuration contents in a case where there is a request for replacement may be made and dealt with depending on circumstances.

In addition, the corner portion material 5 is unnecessary, for example, in a case where the corner portion material 5 is configured a portion of the ceiling material 4 and an end part of the left side wall 23 or the right side wall 24.

Additionally, the booth 1 may have a configuration in which the booth 1 is constructed without using one or both of the floor material 3 and the ceiling material 4.

Additionally, in Exemplary Embodiment 1, a configuration example in which one entrance/exit door 6A or 6B is present is exemplified as the booth 1. However, the booth 1 may be a booth in which a plurality of entrance/exit doors 6 are present.

Additionally, in Exemplary Embodiment 1, a configuration example in which the entrance/exit door 6A or 6B is fixed to the front wall 21A or the left side wall 23A that is a divided side wall is exemplified as the entrance/exit door 6A and 6B. However, the entrance/exit door 6 may be attachably and detachably provided in any of the divided side walls.

In this case, it is possible to replace only the entrance/exit door 6 with another entrance/exit door 6 having a different type or the like without performing replacement in units of divided side walls, and accordingly, it is also possible to change the configuration contents of the booth 1.

Additionally, in the case of the booth 1 in which a plurality of entrance/exit doors 6 are attachably and detachably provided, it is possible to replace some or all entrance/exit doors 6 with other entrance/exit doors 6 having different configuration contents.

In this case, by replacing some entrance/exit doors 6 with members (for example, wall members, window members, vent holes, housing parts) other than the doors, it is also possible to reduce the number of entrance/exit doors to perform change to other configuration contents or add configuration contents.

Figure 20A:
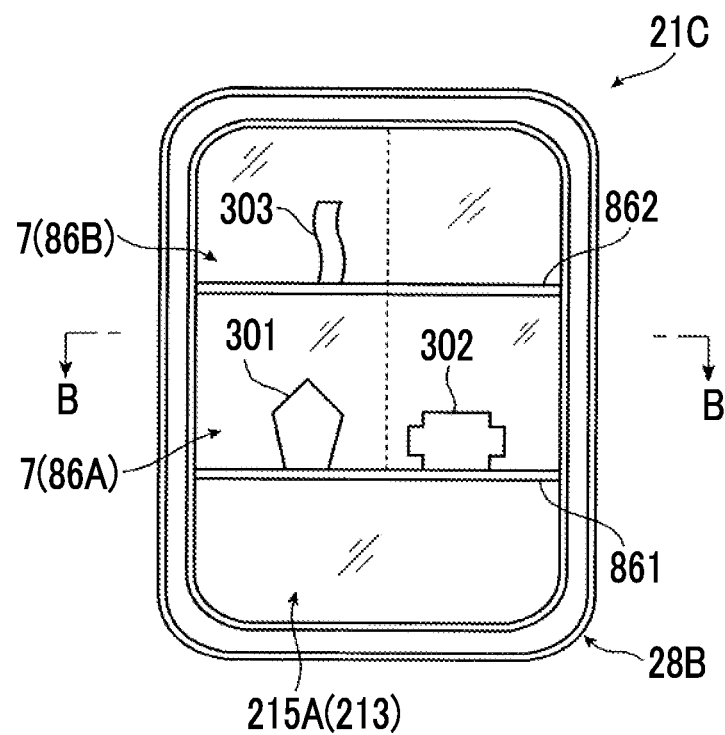
FIG. 20A is a schematic front view illustrating another configuration example of a divided side wall.
Figure 20B:
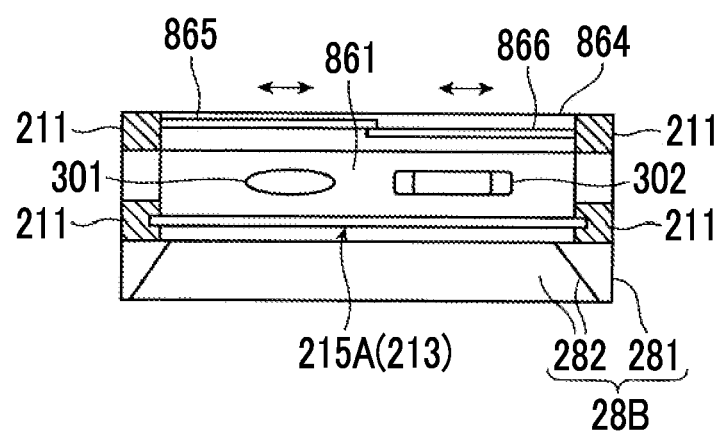
FIG. 20B is a schematic cross-sectional view along line B-B of the divided side wall of FIG. 20A.

Moreover, as illustrated in FIGS. 20A and 20B, at least one of the divided side walls may be configured to provide a see-through exhibition space portion 86 for installing exhibition items (301 to 303) as examples of the facility articles 7.

A divided side wall illustrated in FIGS. 20A and 20B are the third type of front wall 21C having a substantially entirely see-through configuration. The exhibition space portion 86 in the front wall 21C is the exhibition space portions 86A and 86B of a two-stage configuration in which, for example, two exhibition shelves 861 and 862 are provided above and below inside a see-through fixed front part 215A made of the tempered glass 213.

The exhibition space portions 86A and 86B are used by installing any exhibition items 301 to 303 desired by a booth user on the exhibition shelves 861 and 862 only in the use time.

Additionally, for example, in a case where exhibition items of people other than a booth user are exhibited, as illustrated in FIGS. 20A and 20B, the exhibition space portions 86A and 86B may be configured such that two openable and closable sliding doors 865 and 866 are provided further inside the exhibition shelves 861 and 862 so that that the sliding doors 865 and 866 can be locked.

In this case, the sliding doors 865 and 866 may be attached to, for example, a supporting material in which guide rails 864 are formed. Additionally, the sliding doors 865 and 866 may be non-see-through sliding doors in addition to the sliding doors having a see-through configuration.

An advertisement function for a booth user and a passerby around a booth is added to the booth 1 with the divided side walls provided with the exhibition space portions 86A and 86B as described above. This type of booth 1 can also be used, for example, so as to exhibit an object made by a user on the exhibition space portions 86A and 86B and then, advertise the object by performing a task for actually making the object in an internal space. In addition, the exhibition space portion is not limited to the configuration illustrated in FIGS. 20A to 20B, and other configurations can be adopted. Additionally, the exhibition space portions 86A and 86B are so-called mini-version show window.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A booth comprising:
a door from which a user is able to enter an internal space of the booth, the door having a locking part, the locking part being controlled based on reservation information of the booth;
a display that is disposed on an outer wall surface of the booth, the display displaying information that indicates presence of the user in the booth;
a ceiling having:
   a light that lights the internal space of the booth;
   a fire extinguishing medium discharge part; and
   a heat sensor, wherein the heat sensor has a motion detecting function that detects the presence of the user in the booth;
a bottom having:
   a caster that is configured for a movement of the booth; and
   a fixing part that fixes the booth on a floor surface of a place where the booth is installed; and
an extinguishing medium supply device that is disposed on the outer wall surface of the booth, connected to the extinguishing medium discharge part of the ceiling via a pipe, and adapted to supply a fire extinguishing medium into the internal space of the booth, wherein the display and the extinguishing medium supply device are disposed on opposite sides of the booth,
wherein the fire extinguishing medium discharge part is adapted to discharge the fire distinguishing medium from the extinguishing medium supply device to the internal space of the booth in response to the heat sensor detecting a heat equals to or greater than a predetermined level inside the booth.

2. The booth according to claim 1, wherein the booth further comprises a ventilation fan that promotes ventilation of air inside the booth.

3. The booth according to claim 1, wherein the booth further comprises an electrical device.

4. The booth according to claim 3, wherein the electrical device is any one or more of an information telecommunications device, a power distributor, a transformer, a power source device, and a monitor screen device.

5. The booth according to claim 4, the information telecommunications device is a wired router, a wireless router, or a gateway.

6. The booth according to claim 1, wherein the display further has any one or more functions of an input function, an authentication function, a reading function, and a payment receiving function.

7. The booth according to claim 1, wherein the booth is constituted by a plurality of divided side walls.

8. The booth according to claim 7, wherein a plurality of booths each including the plurality of divided side walls are coupled to each other side by side.

9. The booth according to claim 1, wherein the fixing part is configured to adjust a height of the booth.

10. The booth according to claim 1, wherein the heat sensor is disposed on an inner wall side of the ceiling facing the internal space of the booth.

11. The booth according to claim 1, wherein the fire extinguishing medium discharge part is aligned with an inner wall surface of the ceiling facing the internal space of the booth.

12. The booth according to claim 1, wherein the door is a see-through door.

13. The booth according to claim 12, wherein the door is made of a glass.

14. The booth according to claim 1, wherein the door further comprises a gripping part.

15. The booth according to claim 14, wherein the gripping part is a handle.

16. The booth according to claim 1, wherein the display further comprises a certification unit that certifies the user.

17. The booth according to claim 1, wherein the display further comprises a payment unit that allows the user to pay a use fee.

18. The booth according to claim 1, wherein the display further comprises a reception unit that performs use reservation.

* * * * *